United States Patent
Mahan et al.

(10) Patent No.: US 11,512,193 B2
(45) Date of Patent: Nov. 29, 2022

(54) POLYMERIC SUBSTRATE INCLUDING A BARRIER LAYER

(71) Applicant: INV Polypropylene, LLC, Wichita, KS (US)

(72) Inventors: Ross Michael Mahan, Longview, TX (US); Billy R. Bodiford, White Oak, TX (US)

(73) Assignee: INV Polypropylene, LLC, Wichita, KS (US)

( * ) Notice: Subject to any disclaimer, the term of this patent is extended or adjusted under 35 U.S.C. 154(b) by 180 days.

(21) Appl. No.: 17/118,680

(22) Filed: Dec. 11, 2020

(65) Prior Publication Data
US 2021/0206954 A1  Jul. 8, 2021

Related U.S. Application Data

(60) Provisional application No. 63/093,564, filed on Oct. 19, 2020, provisional application No. 62/957,336, filed on Jan. 6, 2020.

(51) Int. Cl.
*C08L 23/12* (2006.01)
*C08L 47/00* (2006.01)

(52) U.S. Cl.
CPC .............. *C08L 23/12* (2013.01); *C08L 47/00* (2013.01)

(58) Field of Classification Search
CPC .. C08F 2500/30; C08F 210/02; C08F 210/06; C08F 10/02; C08F 10/06
See application file for complete search history.

(56) References Cited

U.S. PATENT DOCUMENTS

| | | |
|---|---|---|
| 3,540,962 A | 11/1970 | Anzawa et al. |
| 3,932,563 A | 1/1976 | Argurio |
| 4,064,296 A | 12/1977 | Bornstein et al. |
| 4,726,984 A | 2/1988 | Shah |
| 4,880,697 A | 11/1989 | Caldwell et al. |
| 5,006,378 A | 4/1991 | Itaba et al. |
| 5,084,352 A | 1/1992 | Percec et al. |
| 5,128,183 A | 7/1992 | Buzio |
| 5,141,801 A | 8/1992 | Takeshita et al. |

(Continued)

FOREIGN PATENT DOCUMENTS

| | | |
|---|---|---|
| EP | 0564206 A2 | 10/1993 |
| EP | 0785969 A1 | 7/1997 |

(Continued)

OTHER PUBLICATIONS

International Search Report and Written Opinion of the International Searching Authority dated Mar. 9, 2021 in PCT/IB2020/061836.

(Continued)

*Primary Examiner* — Mark S Kaucher

(57) ABSTRACT

A polymeric substrate is disclosed. The polymeric substrate comprises a barrier layer including a polymeric material comprising about 50 wt. % or more of at least one polyolefin polymer and 50 wt. % or less of a hydrocarbon resin. The polymeric material exhibits a DTUL of 30° C. or more and a tensile modulus of 500 MPa or more and/or a flexural secant modulus of 500 MPa or more. The barrier layer has a thickness of greater than 200 μm to 6,500 μm. A shaped polymeric article comprising the polymeric substrate is also disclosed.

20 Claims, 3 Drawing Sheets

(56) References Cited

U.S. PATENT DOCUMENTS

| | | | |
|---|---|---|---|
| 5,155,160 A | 10/1992 | Yeh et al. | |
| 5,218,049 A | 6/1993 | Yamamoto | |
| 5,246,659 A | 9/1993 | Crighton | |
| 5,300,352 A | 4/1994 | Honma | |
| 5,441,806 A | 8/1995 | Brandt et al. | |
| 5,441,807 A | 8/1995 | Brandt et al. | |
| 5,462,788 A | 10/1995 | Ohashi | |
| 5,482,771 A | 1/1996 | Shah | |
| 5,629,398 A | 5/1997 | Okamoto | |
| 5,648,443 A | 7/1997 | Okamoto | |
| 5,679,422 A | 10/1997 | Lind et al. | |
| 5,693,728 A | 12/1997 | Okamoto | |
| 5,777,055 A | 7/1998 | Peiffer et al. | |
| 5,792,549 A | 8/1998 | Wilkie | |
| 5,837,787 A | 11/1998 | Harrington | |
| 5,912,070 A | 6/1999 | Miharu | |
| 5,914,164 A | 6/1999 | Ciocca et al. | |
| 6,087,446 A * | 7/2000 | Klosiewicz | C08J 3/005 525/197 |
| 6,106,935 A | 8/2000 | Lambert et al. | |
| 6,159,612 A | 12/2000 | Chu et al. | |
| 6,221,470 B1 | 4/2001 | Ciocca et al. | |
| 6,255,396 B1 | 7/2001 | Ding | |
| 6,383,583 B1 | 5/2002 | Ninomiya et al. | |
| 6,458,470 B1 | 10/2002 | Delisio et al. | |
| 6,479,116 B1 | 11/2002 | Small, Jr. et al. | |
| 6,503,588 B1 | 1/2003 | Hayashi et al. | |
| 6,572,956 B1 | 6/2003 | Pickett | |
| 6,590,033 B2 | 7/2003 | Ding | |
| 6,607,814 B2 | 8/2003 | Pickett | |
| 6,767,966 B2 | 7/2004 | Berger | |
| 6,777,067 B1 | 8/2004 | Speith-herfurth et al. | |
| 6,811,886 B1 | 11/2004 | Speith-herfurth et al. | |
| 7,238,164 B2 | 7/2007 | Childers | |
| 7,273,650 B2 | 9/2007 | Pickett | |
| 7,314,901 B2 | 1/2008 | Kuo et al. | |
| 7,348,052 B2 | 3/2008 | Mueller | |
| 7,514,147 B2 | 4/2009 | Davis | |
| 7,794,848 B2 | 9/2010 | Breese | |
| 7,956,138 B2 | 6/2011 | Holtcamp | |
| 8,557,919 B2 | 10/2013 | Lu et al. | |
| 8,920,914 B2 | 12/2014 | Lu | |
| 9,062,189 B2 | 6/2015 | Rodgers | |
| 9,248,632 B2 | 2/2016 | Bellmore et al. | |
| 9,429,256 B2 | 8/2016 | Baccaro et al. | |
| 9,486,987 B2 | 11/2016 | Banerjee et al. | |
| 9,701,445 B2 | 7/2017 | Witthuhn et al. | |
| 9,840,569 B2 | 12/2017 | Blok | |
| 10,421,258 B2 | 9/2019 | Lee et al. | |
| 10,870,253 B2 | 12/2020 | Deplace et al. | |
| 10,906,276 B2 | 2/2021 | Strunk-westermann et al. | |
| 10,920,115 B2 | 2/2021 | Zheng et al. | |
| 11,148,402 B2 | 10/2021 | Tashiro et al. | |
| 11,167,534 B2 | 11/2021 | Limatibul | |
| 11,279,118 B2 | 3/2022 | Kelly | |
| 11,286,377 B2 | 3/2022 | Komuro | |
| 11,292,234 B2 | 4/2022 | Gargalaka, Jr. et al. | |
| 11,338,559 B2 | 5/2022 | D'agosto et al. | |
| 11,384,228 B2 | 7/2022 | Perez Muñoz et al. | |
| 2003/0148119 A1 | 8/2003 | Su et al. | |
| 2003/0211298 A1 | 11/2003 | Migliorini et al. | |
| 2004/0053054 A1 | 3/2004 | Bobovitch et al. | |
| 2008/0099540 A1 | 5/2008 | Mueller | |
| 2008/0286547 A1 | 11/2008 | Hubbard et al. | |
| 2009/0029182 A1 | 1/2009 | Aubee et al. | |
| 2009/0311524 A1 | 12/2009 | Noma et al. | |
| 2010/0062274 A1 | 3/2010 | Leth | |
| 2010/0189942 A1 | 7/2010 | Tamura et al. | |
| 2012/0233965 A1 | 9/2012 | Riccio et al. | |
| 2013/0129949 A1 | 5/2013 | Iwasaki et al. | |
| 2014/0199505 A1 | 7/2014 | Lorenzetti et al. | |
| 2016/0167347 A1 | 6/2016 | Jung et al. | |
| 2018/0015707 A1* | 1/2018 | Kani | B32B 27/18 |
| 2019/0002178 A1 | 1/2019 | Tatarka et al. | |
| 2019/0119477 A1 | 4/2019 | Lemoux | |
| 2019/0299574 A1 | 10/2019 | Ackermans et al. | |
| 2019/0375535 A1* | 12/2019 | Vanswijgenhoven | B29C 53/581 |
| 2020/0079942 A1 | 3/2020 | Van Houcke | |
| 2021/0308995 A1 | 10/2021 | Nair et al. | |
| 2021/0347101 A1 | 11/2021 | Dabadie et al. | |
| 2022/0144515 A1 | 5/2022 | Priscal et al. | |

FOREIGN PATENT DOCUMENTS

| | | |
|---|---|---|
| EP | 0683719 B1 | 11/1998 |
| EP | 1344642 A2 | 9/2003 |
| EP | 0873863 B1 | 9/2004 |
| EP | 1552921 A1 | 7/2005 |
| EP | 1735153 B1 | 1/2010 |
| EP | 3009263 A1 | 4/2016 |
| EP | 4019246 A1 | 6/2022 |
| JP | S61120816 A | 6/1986 |
| JP | H0376646 A | 4/1991 |
| JP | H03169546 A | 7/1991 |
| JP | H03178435 A | 8/1991 |
| JP | H06198826 A | 7/1994 |
| JP | H07179625 A | 7/1995 |
| JP | H1025349 A | 1/1998 |
| JP | H11130846 A | 5/1999 |
| JP | 2004243562 A | 9/2004 |
| JP | 2009102651 A | 5/2009 |
| JP | 2013123814 A | 6/2013 |
| JP | 2016203634 A | 12/2016 |
| JP | 2017226145 A | 12/2017 |
| JP | 2019177909 A | 10/2019 |
| JP | 2020147669 A * | 9/2020 |
| WO | 9611983 A1 | 4/1996 |
| WO | 9641718 A1 | 12/1996 |
| WO | 0238383 A1 | 5/2002 |
| WO | 2007060086 A1 | 5/2007 |
| WO | 2013096079 A1 | 6/2013 |
| WO | 2014173971 A1 | 10/2014 |
| WO | 2020196184 A1 | 10/2020 |
| WO | 2020204984 A1 | 10/2020 |
| WO | 2021140382 A1 | 7/2021 |
| WO | 2021198997 A1 | 10/2021 |
| WO | 2021247162 A1 | 12/2021 |
| WO | 2022029228 A1 | 2/2022 |
| WO | 2022036373 A1 | 2/2022 |
| ZA | 9901097 B | 8/2000 |

OTHER PUBLICATIONS

Arkawa Chemicals: Arkan P and M series, Jun. 9, 2014 (JUn. 9, 2014), XP055369723, Retrieved from the Internet: URL:http://www.arakawa-usa.com/pdf/ARKON_PandMseries.POF [retrieved on May 4, 2017].

FDA, Inventory of Effective Food Contact Substance (FCS) Notifications, FCN No. 166, Arakawa Chemical Industries, Ltd., Feb. 28, 2020, retrieved from the internet URL: https://www.cfsanappsexternal.fda.gov/scripts/fdcc/index.cfm?set=FCN&id=166&sort=FCN_No&order=D [retrieved on Mar. 30, 2020].

* cited by examiner

POLYMERIC SUBSTRATE INCLUDING A BARRIER LAYER

CROSS REFERENCE TO RELATED APPLICATIONS

This application is based on U.S. Provisional Patent Application No. 62/957,336, filed Jan. 6, 2020, and on U.S. Provisional Patent Application No. 63/093,564, filed Oct. 19, 2020. The priorities of the foregoing applications are hereby claimed and their disclosures incorporated herein by reference in their entirety.

BACKGROUND

Packaging is an important component for the preservation and transport of many items central to modern life. For instance, food and drink products, household chemicals, and cosmetics are examples of areas where packaging plays an important role in preserving and transferring products from producers to final consumers. Historically, ceramic, metal, and glass were utilized for storage and transport. However, mobility associated with modern life has created a demand for more flexibility in container design and reduction in costs associated with packaging and transport. Development of polymeric materials and associated processing techniques fulfilled this demand by introducing opportunities for replacement of historical materials with polymeric solutions. However, many current solutions have limited recycle value which negatively impacts sustainability.

In general, polymeric materials that serve as a barrier to water vapor and certain gases, such as oxygen and/or carbon dioxide, may be utilized to form shaped polymeric articles that serve as packaging materials. For instance, such effectiveness with respect to the barrier properties can allow for the polymeric materials and resulting shaped polymeric articles to extend the shelf-life of the product stored therein. The barrier properties for water vapor and gases can vary depending on the particular polymeric material utilized. For instance, some polymeric materials have been discovered that efficiently serve as a good barrier material for water vapor and a poor barrier material for gases while other polymeric materials serve as a poor barrier material for water vapor and a good barrier material for gases. In certain instances, techniques or treatments can be employed to provide a polymeric material that may serve as an effective barrier for both water vapor and these gases. However, these treatments may affect the aesthetic properties (e.g., clarity) of the packaging material and may also adversely affect the mechanical properties of such material, in particular when the materials have relatively greater thicknesses. Aside from the barrier properties, mechanical properties, and optical properties, certain polymeric materials may also not be as effective in forming a shaped polymeric article according to certain forming or molding processes. Finally, recycling of some current polymeric materials can be complicated by certain techniques or treatments used to create barrier performance, resulting in undesirable and inefficient waste streams.

As a result, there is a need to provide a shaped polymeric article having improved aesthetic properties that serves as an effective barrier for water vapor and certain gases while also exhibiting desired physical properties that are sustainable through multiple uses or life cycles.

SUMMARY

In general, one embodiment of the present disclosure is directed to a polymeric substrate including a barrier layer including a polymeric material comprising about 50 wt. % or more of at least one polyolefin polymer and 50 wt. % or less of a hydrocarbon resin. The polymeric material exhibits a DTUL of 45° C. or more and a tensile modulus of 1,000 MPa or more. The barrier layer has a thickness of greater than 200 µm to 6,500 µm.

In general, another embodiment of the present disclosure is directed to a shaped polymeric article including a polymeric substrate including a barrier layer including a polymeric material comprising about 50 wt. % or more of at least one polyolefin polymer and 50 wt. % or less of a hydrocarbon resin. The polymeric material exhibits a DTUL of 45° C. or more and a tensile modulus of 1,000 MPa or more. The barrier layer has a thickness of greater than 200 µm to 6,500 µm.

In general, another embodiment of the present disclosure is directed to a polymeric substrate including a barrier layer including a polymeric material comprising about 50 wt. % or more of at least one polyolefin polymer and 50 wt. % or less of a hydrocarbon resin. The polymeric material exhibits a DTUL of 30° C. or more and a flexural secant modulus of 500 MPa or more. The barrier layer has a thickness of greater than 200 µm to 6,500 µm.

In general, another embodiment of the present disclosure is directed to a shaped polymeric article including a polymeric substrate including a barrier layer including a polymeric material comprising about 50 wt. % or more of at least one polyolefin polymer and 50 wt. % or less of a hydrocarbon resin. The polymeric material exhibits a DTUL of 30° C. or more and a flexural secant modulus of 500 MPa or more. The barrier layer has a thickness of greater than 200 µm to 6,500 µm.

BRIEF DESCRIPTION OF THE FIGURES

A full and enabling disclosure of the present invention, including the best mode thereof to one skilled in the art, is set forth more particularly in the remainder of the specification, including reference to the accompanying figures, in which.

DETAILED DESCRIPTION

Figure 1:
FIG. 1 is a side perspective view of a single layer sheet including a barrier layer according to the present invention.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

In general, the present disclosure is directed to a polymeric substrate including a barrier layer including a polymeric material comprising about 50 wt. % or more of at least one polyolefin polymer and 50 wt. % or less of a hydrocarbon resin. The present inventors have discovered that such a polymeric substrate can exhibit an unexpected improvement in certain mechanical properties while also exhibiting suitable water vapor and oxygen transmission properties as well as a suitable transparency. Such unexpected combination of properties as described herein can enable the use of such polymeric substrates and resulting shaped polymeric articles for specific packaging applications, such as those requiring extended shelf life, high wall stiffness, and/or excellent clarity.

The polymeric substrate and/or barrier layer and/or polymeric material as disclosed herein may demonstrate improved performance at higher temperatures. For instance, as indicated by the deflection temperature under load ("DTUL"), the temperature at which deformation occurs under a specified load may be relatively high. In this regard, the present inventors have discovered that the DTUL may be of 30° C. or more, such as 40° C. or more, such as 45° C. or more, such as 50° C. or more, such as 60° C. or more, such as 70° C. or more, such as 80° C. or more, such as 90° C. or more, such as 100° C. or more, such as 110° C. or more, such as 125° C. or more. The DTUL may be 130° C. or less, such as 120° C. or less, such as 110° C. or less, such as 100° C. or less, such as 90° C. or less, such as 80° C. or less, such as 75° C. or less. The aforementioned property may apply to the polymeric substrate, the barrier layer, and/or the polymeric material as disclosed herein.

As further support of the strength of the polymeric substrate and/or barrier layer and/or polymeric material, it may also exhibit a relatively high tensile modulus, which is a generally indication of the stiffness. In this regard, the tensile modulus may be 500 MPa or more, such as 600 MPa or more, such as 700 MPa or more, such as 750 MPa or more, such as 800 MPa or more, such as 900 MPa or more, such as 1,000 MPa or more, such as 1,250 MPa or more, such as 1,500 MPa or more, such as 2,000 MPa or more, such as 2,250 MPa or more, such as 2,500 MPa or more, such as 2,750 MPa or more, such as 3,000 MPa or more, such as 3,250 MPa or more, such as 3,500 MPa or more, such as 4,000 MPa or more. The tensile modulus may be 5,000 MPa or less, such as 4,500 MPa or less, such as 4,000 MPa or less, such as 3,750 MPa or less, such as 3,500 MPa or less, such as 3,000 MPa or less, such as 2,500 MPa or less, such as 2,000 MPa or less, such as 1,500 MPa or less, such as 1,000 MPa or less. The aforementioned property may apply to the polymeric substrate, the barrier layer, and/or the polymeric material as disclosed herein.

In addition, the polymeric substrate and/or barrier layer and/or polymeric material may exhibit a relatively high tensile strength at yield. For instance, the tensile strength at yield may be 20 MPa or more, such as 25 MPa or more, such as 30 MPa or more, such as 35 MPa or more, such as 40 MPa or more, such as 45 MPa or more. The tensile strength at yield may be 200 MPa or less, such as 150 MPa or less, such as 100 MPa or less, such as 90 MPa or less, such as 80 MPa or less, such as 70 MPa or less, such as 60 MPa or less, such as 50 MPa or less, such as 45 MPa or less. The aforementioned property may apply to the polymeric substrate, the barrier layer, and/or the polymeric material as disclosed herein.

Also, the polymeric substrate and/or barrier layer and/or polymeric material may exhibit a certain percent elongation at yield. For instance, the percent elongation at yield may be 10% or less, such as 8% or less, such as 6% or less, such as 5% or less, such as 4% or less, such as 3% or less, such as 2.5% or less, such as 2% or less, such as 1.5% or less. The percent elongation at yield may be 0.01% or more, such as 0.05% or more, such as 0.1% or more, such as 0.3% or more, such as 0.5% or more, such as 0.8% or more, such as 1% or more, such as 1.3% or more, such as 1.5% or more, such as 1.8% or more, such as 2% or more, such as 2.2% or more, such as 2.4% or more. The aforementioned property may apply to the polymeric substrate, the barrier layer, and/or the polymeric material as disclosed herein.

In addition to the tensile properties, the polymeric substrate and/or barrier layer and/or polymeric material may also exhibit desired flexural properties. For instance, the flexural tangent modulus may be 500 MPa or more, such as 800 MPa or more, such as 1,000 MPa or more, such as 1,250 MPa or more, such as 1,500 MPa or more, such as 2,000 MPa or more, such as 2,250 MPa or more, such as 2,500 MPa or more, such as 2,750 MPa or more, such as 3,000 MPa or more, such as 3,250 MPa or more, such as 3,500 MPa or more, such as 4,000 MPa or more. The flexural tangent modulus may be 5,000 MPa or less, such as 4,500 MPa or less, such as 4,000 MPa or less, such as 3,750 MPa or less, such as 3,500 MPa or less, such as 3,000 MPa or less, such as 2,500 MPa or less, such as 2,000 MPa or less, such as 1,500 MPa or less, such as 1,000 MPa or less. The aforementioned property may apply to the polymeric substrate, the barrier layer, and/or the polymeric material as disclosed herein.

Also, the polymeric substrate and/or barrier layer and/or polymeric material may have a certain flexural secant modulus. The flexural secant modulus may be 500 MPa or more, such as 800 MPa or more, such as 1,000 MPa or more, such as 1,250 MPa or more, such as 1,500 MPa or more, such as 2,000 MPa or more, such as 2,250 MPa or more, such as 2,500 MPa or more, such as 2,750 MPa or more, such as 3,000 MPa or more, such as 3,250 MPa or more, such as 3,500 MPa or more, such as 4,000 MPa or more. The flexural secant modulus may be 5,000 MPa or less, such as 4,500 MPa or less, such as 4,000 MPa or less, such as 3,750 MPa or less, such as 3,500 MPa or less, such as 3,000 MPa or less, such as 2,500 MPa or less, such as 2,000 MPa or less, such as 1,500 MPa or less, such as 1,000 MPa or less. The aforementioned property may apply to the polymeric substrate, the barrier layer, and/or the polymeric material as disclosed herein.

Also, the polymeric substrate and/or barrier layer and/or polymeric material may exhibit a certain impact strength. For instance, the Notched Izod impact strength at 23° C. may be 0.1 J/m or more, such as 0.5 J/m or more, such as 1 J/m or more, such as 2 J/m or more, such as 5 J/m or more, such as 8 J/m or more, such as 10 J/m or more. The Notched Izod impact strength at 23° C. may be 50 J/m or less, such as 40 J/m or less, such as 30 J/m or less, such as 25 J/m or less, such as 20 J/m or less, such as 18 J/m or less, such as 15 J/m or less, such as 13 J/m or less, such as 10 J/m or less. In addition, the Gardner impact strength at 23° C. may be 0.01 J or more, such as 0.1 J or more, such as 0.2 J or more, such as 0.3 J or more, such as 0.5 J or more, such as 0.7 J or more, such as 0.8 J or more, such as 1 J or more. The Gardner impact strength at 23° C. may be 10 J or less, such as 8 J or less, such as 5 J or less, such as 3 J or less, such as 2 J or less, such as 1.5 J or less, such as 1 J or less, such as 0.9 J or less, such as 0.8 J or less, such as 0.7 J or less, such as 0.5 J or less. The aforementioned property may apply to the polymeric substrate, the barrier layer, and/or the polymeric material as disclosed herein.

In addition, the polymeric material may have a certain melt flow rate. For instance, the melt flow rate may be 1 g/10 min or more, such as 2 g/10 min or more, such as 2.2 g/10 min or more, such as 2.5 g/10 min or more, such as 3 g/10 min or more, such as 3.5 g/10 min or more, such as 4 g/10 min or more, such as 4.5 g/10 min or more, such as 5 g/10 min or more, such as 10 g/10 min or more, such as 15 g/10 min or more, such as 20 g/10 min or more, such as 30 g/10 min or more. The melt flow rate may be 100 g/10 min or less, such as 80 g/10 min or less, such as 60 g/10 min or less, such as 50 g/10 min or less, such as 40 g/10 min or less, such as 30 g/10 min or less, such as 20 g/10 min or less, such as 15 g/10 min or less, such as 11 g/10 min or less, such as 10 g/10 min or less, such as 9 g/10 min or less, such as 8 g/10 min or less, such as 7.5 g/10 min or less, such as 7 g/10 min or less, such as 6.5 g/10 min or less, such as 6 g/10 min or less.

Also important for various applications are the optical properties, in particular the transparency and/or haze, of the polymeric substrate and/or barrier layer and/or polymeric material. For instance, it may be desired to have a low haze. Even with certain additives and being relatively thicker, the percent haze may be 60 or less, such as 50 or less, such as 40 or less, such as 30 or less, such as 20 or less, such as 18 or less, such as 16 or less, such as 14 or less, such as 12 or less, such as 10 or less, such as 8 or less, such as 6 or less, such as 5 or less, such as 4 or less. The percent haze may be 0 or more, such as 1 or more, such as 2 or more, such as 3 or more, such as 4 or more, such as 5 or more, such as 10 or more, such as 25 or more. In addition, the percent clarity may be 90 or more, such as 95 or more, such as 96 or more, such as 97 or more, such as 98 or more, such as 99 or more. The aforementioned properties may apply to the polymeric substrate, the barrier layer, and/or the polymeric material as disclosed herein. In addition, such property may be realized at a single thickness value or within a range of thicknesses as disclosed herein. For instance, the percent haze or clarity may be for the polymeric material when formed at a particular thickness (e.g., 25 mils and/or 50 mils). The percent haze and clarity may be determined in accordance with ASTM D1003.

In addition to the desirable mechanical properties and optical properties, the polymeric substrate and/or barrier layer and/or polymeric material as disclosed herein may also exhibit relatively low transmission properties. Such transmission properties may allow for the polymeric substrate and/or barrier layer and/or polymeric material to be utilized for various packaging applications. In this regard, the polymeric substrate and/or barrier layer and/or polymeric material may exhibit a relatively low water vapor transmission rate and/or oxygen transmission rate. For instance, the water vapor transmission rate may be 5 $cm^3/m^2/day$ or less, such as 4 $cm^3/m^2/day$ or less, such as 3 $cm^3/m^2/day$ or less, such as 2 $cm^3/m^2/day$ or less, such as 1 $cm^3/m^2/day$ or less, such as 0.5 $cm^3/m^2/day$ or less, such as 0.1 $cm^3/m^2/day$ or less, such as 0.08 $cm^3/m^2/day$ or less, such as 0.06 $cm^3/m^2/day$ or less, such as 0.05 $cm^3/m^2/day$ or less, such as 0.03 $cm^3/m^2/day$ or less, such as 0.01 $cm^3/m^2/day$ or less, such as 0.005 $cm^3/m^2/day$ or less, such as 0.001 $cm^3/m^2/day$ or less. The water vapor transmission rate may be more than 0 $cm^3/m^2/day$, such as 0.001 $cm^3/m^2/day$ or more, such as 0.005 $cm^3/m^2/day$ or more, such as 0.01 $cm^3/m^2/day$ or more, such as 0.05 $cm^3/m^2/day$ or more, such as 0.1 $cm^3/m^2/day$ or more. Also, the oxygen transmission rate may be 60 $cm^3/100$ $in^2/day$ or less, such as 50 $cm^3/100$ $in^2/day$ or less, such as 40 $cm^3/100$ $in^2/day$ or less, such as 30 $cm^3/100$ $in^2/day$ or less, such as 25 $cm^3/100$ $in^2/day$ or less, such as 20 $cm^3/100$ $in^2/day$ or less, such as 15 $cm^3/100$ $in^2/day$ or less, such as 10 $cm^3/100$ $in^2/day$ or less, such as 5 $cm^3/100$ $in^2/day$ or less, such as 4 $cm^3/100$ $in^2/day$ or less, such as 3 $cm^3/100$ $in^2/day$ or less, such as 2.5 $cm^3/100$ $in^2/day$ or less. The oxygen transmission rate may be more than 0 $cm^3/100$ $in^2/day$, such as 0.5 $cm^3/100$ $in^2/day$ or more, such as 1 $cm^3/100$ $in^2/day$ or more, such as 3 $cm^3/100$ $in^2/day$ or more, such as 5 $cm^3/100$ $in^2/day$ or more, such as 8 $cm^3/100$ $in^2/day$ or more, such as 10 $cm^3/100$ $in^2/day$ or more. The oxygen transmission rate may be for the polymeric material when formed at a particular thickness (e.g., 8 mils, 10 mils, and/or 18 mils).

Interestingly, the present inventors have discovered that the aforementioned properties may be realized when the thickness is relatively greater. For instance, the polymeric substrate may have a thickness of more than 200 μm, such as 210 μm or more, such as 220 μm or more, such as 240 μm or more, such as 250 μm or more, such as 300 μm or more, such as 350 μm or more, such as 400 μm or more, such as 500 μm or more, such as 700 μm or more, such as 900 μm or more, such as 1 mm or more, such as 2 mm or more, such as 3 mm or more, such as 5 mm or more. The polymeric substrate may have a thickness of 1.25 cm or less, such as 1 cm or less, such as 8 mm or less, such as 5 mm or less, such as 3 mm or less, such as 2 mm or less, such as 1.5 mm or less, such as 1.3 mm or less, such as 1 mm or less, such as 900 μm or less, such as 800 μm or less, such as 700 μm or less, such as 600 μm or less, such as 500 μm or less, such as 400 μm or less, such as 350 μm or less, such as 300 μm or less, such as 280 μm or less, such as 270 μm or less. The aforementioned property may apply to the barrier layer. In addition, when the polymeric substrate is a monolayer polymeric substrate that simply includes the barrier layer as defined herein, the aforementioned thicknesses may also apply to the barrier layer.

A. Polyolefin Polymer

The polymeric substrate as disclosed herein comprises a barrier layer including a polymeric material including at least one polyolefin polymer. For instance, the polyolefin polymer may be one formed from an olefin monomer, such as an α-olefin monomer. In this regard, the monomer may be ethylene such that the polyolefin polymer includes an ethylene polymer. In addition, the monomer may be propylene such that the polyolefin polymer includes a propylene polymer. In one particular embodiment, the polyolefin polymer comprises a propylene polymer.

In general, the polyolefin polymer may be a homopolymer or a copolymer. In one embodiment, the polyolefin polymer comprises a homopolymer. For example, when the polyolefin polymer comprises a propylene polymer, such polymer may be a propylene homopolymer. In another embodiment, the polyolefin polymer comprises a copolymer. For example, when the polyolefin polymer comprises a propylene polymer, such polymer may be a propylene copolymer. Accordingly, in one embodiment, the propylene polymer may be a propylene homopolymer. In another embodiment, the propylene polymer may be a propylene copolymer. In particular, the propylene copolymer may be a propylene elastomer.

Similarly, when the polyolefin polymer comprises a homopolymer and the polyolefin polymer comprises an ethylene polymer, such polymer may be an ethylene homopolymer. In another embodiment, when the polyolefin polymer comprises a copolymer and the polyolefin polymer comprises an ethylene polymer, such polymer may be an ethylene copolymer. Accordingly, in one embodiment, the ethylene polymer may be an ethylene homopolymer. In another embodiment, the ethylene polymer may be an ethylene copolymer. In particular, the ethylene copolymer may be an ethylene elastomer.

When present as a copolymer, the copolymer may include at least one comonomer including at least one α-olefin (i.e., one other than ethylene if an ethylene copolymer or propylene if a propylene copolymer). In this regard, the comonomer may include ethylene (if a propylene copolymer), propylene (if an ethylene copolymer), a $C_4$-$C_{20}$ α-olefin, or a combination thereof. For example, when the comonomer includes a $C_4$-$C_{20}$ α-olefin, the comonomer may in a particular embodiment be a $C_4$-$C_{12}$ α-olefin, such as a $C_4$-$C_{10}$ α-olefin, such as a $C_4$-$C_8$ α-olefin. Regardless, specific examples of α-olefins include, but are not limited to, ethylene, butene (e.g., 1-butene, 3-methyl-1-butene, 3,3-dimethyl-1-butene), pentene (e.g., 4-methyl-1-pentene, 3-methyl-1-pentene), hexene (e.g., 1-hexene, 3,5,5-trimethyl-1-hexene), heptene, octene (e.g., 1-octene, 2-octene), nonene (e.g., 5-methyl-1-nonene), decene, dodecene, and styrene.

In a particular embodiment, the comonomer may include at least one of ethylene (if a propylene copolymer), propylene (if an ethylene copolymer), 1-butene, 1-hexene, or 1-octene. For instance, in one embodiment, the comonomer may include at least ethylene (if a propylene copolymer) or propylene (if an ethylene copolymer). In another embodiment, the comonomers may include at least ethylene and at least one of 1-butene, 1-hexene, or 1-octene.

In addition, it should be understood that suitable α-olefins may be linear or branched (e.g., one or more $C_1$-$C_3$ alkyl branches or an aryl group). For example, in one embodiment, the α-olefin may be linear. In another embodiment, the α-olefin may be branched. In this regard, the α-olefin may be substituted, such as with one or more methyl, dimethyl, trimethyl, ethyl or propyl substituents. However, it should be understood that the α-olefin may also be unsubstituted.

In addition to the above mentioned α-olefin comonomers, the copolymer may optionally include other comonomers. For instance, these comonomers may include aromatic group containing comonomers, non-aromatic cyclic group containing comonomers, and/or diolefin comonomers. For example, these comonomers may contain 4 or more, such as 5 or more, such as 8 or more, such as 10 or more, such as 15 or more carbon atoms to 30 or less, such as 25 or less, such as 20 or less, such as 15 or less, such as 10 or less carbon atoms.

In one embodiment, the comonomer may include a diene. The diene may be a straight chain acyclic olefin, a branched chain acyclic olefin, a single ring alicyclic olefin, a multiring alicyclic fused or bridged ring olefin, a cycloalkenyl-substituted alkene, or a mixture thereof. The diene, may include, but is not limited to, butadiene, pentadiene, hexadiene (e.g., 1,4-hexadiene, 5-methyl-1,4-hexadiene, 1,4-cyclohexadiene), heptadiene (e.g., 1,6-heptadiene), octadiene (e.g., 1,6-octadiene, 1,7-octadiene, 3,7-dimethyl-1,6-octadiene, 3,7-dimethyl-1,7-octadiene, 1,5-cyclooctadiene), nonadiene (e.g., 1,8-nonadiene), decadiene (e.g., 1,9-decadiene), undecadiene (e.g., 1,10-undecadiene), dodecadiene (e.g., 1,11-dodecadiene, 1,7-cyclododecadiene), tridecadiene (e.g., 1,12-tridecadiene), tetradecadiene (e.g., 1,13-tetradecadiene), pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, tetrahydroindene, norbornadiene, methyl-tetrahydroindene, dicyclopentadiene, bicyclo-(2.2.1)-hepta-2,5-diene, alkenyl norbornenes, alkylidene norbornenes (e.g., ethylidiene norbornene), cycloalkenyl norbornenes, cycloalkylene norbornenes (e.g., 5-methylene-2-norbornene, 5-ethylidene-2-norbornene, 5-propenyl-2-norbornene, 5-isopropylidene-2-norbornene, 5-(4-cyclopentenyl)-2-norbornene, 5-cyclohexylidene-2-norbornene, 5-vinyl-2-norbornene), vinyl cyclohexene, allyl cyclohexane, vinyl cyclooctene, 4-vinyl cyclohexene, allyl cyclodecene, vinyl cyclododecene, and tetracyclo (A-11, 12)-5,8-dodecene.

The diene may also include a polybutadiene, such as a low molecular weight butadiene. For example, the polybutadiene may have a weight average molecular weight of about 2,000 g/mol or less, such as about 1,500 g/mol or less, such as about 1,000 g/mol or less. The diene may include a cyclic diene, such as cyclopentadiene, vinyl norbornene, norbornadiene, ethylidene norbornene, divinylbenzene, dicyclopentadiene or higher ring containing diolefins with or without substituents at various ring positions.

Regardless of the type of comonomer(s) utilized, the primary monomer (i.e., ethylene or propylene) may constitute about 50 mole % or more, such as about 60 mole % or more, such as about 65 mole % or more, such as about 70 mole % or more, such as about 75 mole % or more, such as about 80 mole % or more, such as about 85 mole % or more, such as about 90 mole % or more, such as about 93 mole % or more of the copolymer. The primary monomer (i.e., ethylene or propylene) may constitute less than 100 mole %, such as about 99.5 mole % or less, such as about 99 mole % or less, such as about 98 mole % or less, such as about 97 mole % or less, such as about 95 mole % or less of the copolymer. Accordingly, the primary monomer (i.e., ethylene or propylene) may constitute about 50 wt. % or more, such as about 60 wt. % or more, such as about 65 wt. % or more, such as about 70 wt. % or more, such as about 75 wt. % or more, such as about 80 wt. % or more, such as about 85 wt. % or more, such as about 90 wt. % or more, such as about 93 wt. % or more of the copolymer. The primary monomer (i.e., ethylene or propylene) may constitute less than 100 wt. %, such as about 99.5 wt. % or less, such as about 99 wt. % or less, such as about 98 wt. % or less, such as about 97 wt. % or less, such as about 95 wt. % or less of the copolymer.

Likewise, the comonomers, such as the α-olefin, may constitute about 0.1 mole % or more, such as about 0.3 mole % or more, such as about 0.5 mole % or more, such as about 1 mole % or more, such as about 2 mole % or more, such as about 3 mole % or more, such as about 5 mole % or more of the copolymer. The comonomers may constitute less than 50 mole %, such as about 40 mole % or less, such as about 35 mole % or less, such as about 30 mole % or less, such as about 20 mole % or less, such as about 15 mole % or less, such as about 10 mole % or less, such as about 7 mole % or less of the copolymer. Accordingly, the comonomers may constitute about 0.1 wt. % or more, such as about 0.3 wt. % or more, such as about 0.5 wt. % or more, such as about 1 wt. % or more, such as about 2 wt. % or more, such as about 3 wt. % or more, such as about 5 wt. % or more of the copolymer. The comonomers may constitute less than 50 wt. %, such as about 40 wt. % or less, such as about 30 wt. % or less, such as about 25 wt. % or less, such as about 20 wt. % or less, such as about 15 wt. % or less, such as about 10 wt. % or less, such as about 8 wt. % or less, such as about 7 wt. % or less of the copolymer. It should be understood that the aforementioned percentages may apply to all of the comonomers in combination or a single type of comonomer utilized in the copolymer.

In embodiments where a third comonomer (e.g., one not including ethylene) is present, such third comonomer may be present in an amount of about 10 wt. % or less, such as about 5 wt. % or less, such as about 4 wt. % or less, such as about 3 wt. % or less, such as about 2 wt. % or less based on the weight of the copolymer.

In one particular embodiment, the polyolefin polymer may be a polyolefin copolymer elastomer. For instance, the propylene copolymer may be a propylene copolymer elastomer. As generally understood in the art, the elastomer may satisfy the properties of ASTM D1566-19. In one embodiment, the elastomer may include ethylene and at least one comonomer of propylene, butene, hexene, and octene. In another embodiment, the elastomer may include propylene and at least one comonomer of ethylene, butene, hexene, and octene. In one particular embodiment, the elastomer includes propylene and ethylene. For instance, the elastomer may not include any further comonomers. However, in one embodiment, the elastomer may comprise propylene, ethylene, and at least one of butene, hexene, and octene. For instance, the elastomer may include propylene-ethylene-butene, propylene-ethylene-hexene, propylene-ethylene-octene, or a mixture thereof. In this regard, in one embodiment, the elastomer may include propylene-ethylene-butene. In another embodiment, the elastomer may include propylene-ethylene-hexene. In a further embodiment, the elastomer may include propylene-ethylene-octene.

In general, the polyolefin copolymer may have any monomer arrangement. For instance, the polyolefin copolymer may be a random copolymer. Alternatively, in another embodiment, the polyolefin copolymer may be a block copolymer. In a further embodiment, the polyolefin copolymer may be a heterophasic copolymer.

The polyolefin polymer may have a certain molecular structure that may allow for it to be utilized for a specification application. In this regard, the polyolefin polymer may have a certain degree of tacticity. For instance, in one embodiment, the polyolefin polymer may be an isotactic polyolefin polymer. In particular, the polyolefin homopolymer may be an isotactic polyolefin homopolymer. In this regard, the polyolefin polymer may have at least 50%, such as at least 60%, such as at least 70%, such as at least 80%, such as at least 85%, such as at least 90% isotacticity as determined according to analysis by $^{13}$C-NMR.

However, it should be understood that the polyolefin polymer may alternatively have an atactic or syndiotactic molecular structure. For instance, in one embodiment, the polyolefin polymer may be an atactic polyolefin polymer. In another embodiment, the polyolefin polymer may be a syndiotactic polyolefin polymer. For example, the polyolefin polymer may have at least 50%, such as at least 60%, such as at least 70%, such as at least 80%, such as at least 85%, such as at least 90% syndiotacticity as determined according to analysis by $^{13}$C-NMR.

In general, a polyolefin homopolymer may have a greater isotacticity or syndiotacticity and a generally lower atacticity. For example, a syndiotactic polyolefin homopolymer may have a syndiotacticity of at least 80%, such as at least 85%, such as at least 90%. Similarly, an isotactic polyolefin homopolymer may have an isotacticity of at least 80%, such as at least 85%, such as at least 90%. Accordingly, such polyolefin homopolymer may have an atacticity of less than 20%, such as less than 15%, such as less than 10%, such as less than 5%.

In this regard, the polyolefin polymer may have a certain crystallinity. For instance, the crystallinity may be at least about 1%, such as at least about 2%, such as at least about 5%, such as at least about 10%, such as at least about 15%, such as at least about 20%, such as at least about 25%, such as at least about 30%, such as at least about 40%, such as at least about 50%, such as at least about 60%, such as at least about 70%, such as at least about 80%, such as at least about 90%, such as at least about 95%, such as at least about 98%, such as at least about 99%. The crystallinity is generally less than 100%. For instance, the crystallinity may be less than 100%, such as about 99% or less, such as about 98% or less, such as about 95% or less, such as about 90% or less, such as about 80% or less, such as about 70% or less, such as about 60% or less, such as about 50% or less, such as about 40% or less, such as about 30% or less, such as about 20% or less. For instance, a polyolefin homopolymer may generally have a higher crystallinity than a polyolefin copolymer elastomer.

The crystallinity may be determined based on a xylene soluble content. For example, a higher crystallinity will result in a lower xylene soluble content. In this regard, the xylene soluble weight percentage may be 50% or less, such as 40% or less, such as 30% or less, such as 20% or less, such as 15% or less, such as 10% or less, such as 5% or less, such as 4% or less, such as 3% or less, such as 2% or less, such as 1% or less. Without intending to be limited, the xylene soluble content provides a measure of the amorphous portion of the polyolefin polymer. The xylene soluble content can be determined in accordance with ASTM D5492-17.

In general, the crystallinity of the polyolefin polymer can have an impact on the melting temperature as well as the crystallization temperature of the polymer. In this regard, the melting temperature and the crystallization temperature of the polyolefin polymer may be relatively low. For instance, the melting temperature may be about 70° C. or more, such as about 85° C. or more, such as about 100° C. or more, such as about 110° C. or more, such as about 120° C. or more, such as about 130° C. or more, such as about 140° C. or more, such as about 150° C. or more, such as about 160° C. or more, such as about 165° C. or more. The melting temperature may be about 170° C. or less, such as about 160° C. or less, such as about 150° C. or less, such as about 125° C. or less, such as about 115° C. or less, such as about 100° C. or less. For instance, a polyolefin homopolymer may generally have a higher melting temperature than a polyolefin copolymer elastomer.

The crystallization temperature of the polyolefin polymer may be about 70° C. or more, such as about 80° C. or more, such as about 90° C. or more, such as about 95° C. or more, such as about 100° C. or more, such as about 105° C. or more, such as about 110° C. or more, such as about 115° C. or more, such as about 120° C. or more, such as about 125° C. or more. The crystallization temperature may be about 140° C. or less, such as about 130° C. or less, such as about 120° C. or less, such as about 110° C. or less, such as about 100° C. or less.

The glass transition temperature of the polyolefin polymer may be about 125° C. or less, such as about 115° C. or less, such as about 105° C. or less, such as about 100° C. or less, such as about 90° C. or less, such as about 80° C. or less, such as about 70° C. or less, such as about 50° C. or less, such as about 40° C. or less, such as about 30° C. or less, such as about 20° C. or less, such as about 10° C. or less, such as about 0° C. or less. The glass transition temperature may be about −50° C. or more, such as about −40° C. or more, such as about −30° C. or more, such as about −20° C. or more, such as about −10° C. or more, such as about 0° C. or more, such as about 20° C. or more, such as about 40° C. or more, such as about 50° C. or more.

The polyolefin polymer may also have certain properties that may allow for it to be utilized for a specific application. In this regard, the polyolefin polymer may have a particular weight average molecular weight ($M_w$). For instance, the $M_w$ may be about 2,500 g/mol or more, such as about 5,000 g/mol or more, such as about 8,000 g/mol or more, such as about 10,000 g/mol or more, such as about 12,000 g/mol or more, such as about 20,000 g/mol or more, such as about 25,000 g/mol or more, such as about 50,000 g/mol or more, such as about 80,000 g/mol or more, such as about 90,000 g/mol or more, such as about 100,000 g/mol or more, such as about 200,000 g/mol or more, such as about 300,000 g/mol or more. The $M_w$ may be about 1,000,000 g/mol or less, such as about 800,000 g/mol or less, such as about 600,000 g/mol or less, such as about 500,000 g/mol or less, such as about 400,000 g/mol or less, such as about 300,000 g/mol or less, such as about 250,000 g/mol or less, such as about 200,000 g/mol or less, such as about 150,000 g/mol or less, such as about 100,000 g/mol or less, such as about 50,000 g/mol or less. The $M_w$ may be determined using techniques known in the art, such as gel permeation chromatography.

Similarly, the polyolefin polymer may also have a particular number average molecular weight ($M_n$). For instance, the $M_n$ may be about 2,500 g/mol or more, such as about 5,000 g/mol or more, such as about 8,000 g/mol or more, such as about 10,000 g/mol or more, such as about 12,000 g/mol or more, such as about 20,000 g/mol or more, such as about 25,000 g/mol or more, such as about 50,000 g/mol or more, such as about 80,000 g/mol or more, such as about 90,000 g/mol or more, such as about 100,000 g/mol or more, such as about 200,000 g/mol or more, such as about 300,000 g/mol or more. The $M_n$ may be about 1,000,000 g/mol or less, such as about 800,000 g/mol or less, such as about 600,000 g/mol or less, such as about 500,000 g/mol or less, such as about 400,000 g/mol or less, such as about 300,000 g/mol or less, such as about 250,000 g/mol or less, such as about 200,000 g/mol or less, such as about 150,000 g/mol or less, such as about 100,000 g/mol or less, such as about 50,000 g/mol or less. The $M_n$ may be determined using techniques known in the art, such as gel permeation chromatography.

In this regard, the polyolefin polymer may have a particular polydispersity index ($M_w/M_n$). For instance, the polydispersity index may be more than 1, such as about 2 or more, such as about 2.3 or more, such as about 2.5 or more, such as about 3 or more, such as about 3.5 or more, such as about 4 or more. The polydispersity index may be about 9 or less, such as about 8 or less, such as about 7 or less, such as about 5 or less, such as about 4.5 or less, such as about 4 or less, such as about 3.5 or less, such as about 3 or less, such as about 2.5 or less.

The polyolefin polymer may have a particular specific gravity. For instance, the specific gravity may be about 0.8 g/cm$^3$ or more, such as about 0.83 g/cm$^3$ or more, such as about 0.85 g/cm$^3$ or more, such as about 0.86 g/cm$^3$ or more, such as about 0.87 g/cm$^3$ or more, such as about 0.88 g/cm$^3$ or more, such as about 0.9 g/cm$^3$ or more. The specific gravity may be less than 1 g/cm$^3$, such as about 0.95 g/cm$^3$ or less, such as about 0.93 g/cm$^3$ or less, such as about 0.92 g/cm$^3$ or less, such as about 0.91 g/cm$^3$ or less, such as about 0.9 g/cm$^3$ or less, such as about 0.89 g/cm$^3$ or less, such as about 0.88 g/cm$^3$ or less. The specific gravity may be determined according to ASTM D792-20.

The polyolefin polymer may have a particular melt flow rate. For instance, the melt flow rate may be about 0.1 g/10 min or more, such as about 0.2 g/10 min or more, such as about 0.3 g/10 min or more, such as about 0.4 g/10 or more, such as about 0.5 g/10 min or more, such as about 1 g/10 min or more, such as about 1.5 g/10 min or more, such as about 2 g/10 min or more, such as about 5 g/10 min or more, such as about 10 g/10 min or more, such as about 20 g/10 min or more, such as about 25 g/10 min or more. The melt flow rate may be about 500 g/10 min or less, such as about 200 g/10 min or less, such as about 100 g/10 min or less, such as about 50 g/10 min or less, such as about 40 g/10 min or less, such as about 20 g/10 min or less, such as about 10 g/10 min or less, such as about 5 g/10 min or less, such as about 4 g/10 min or less, such as about 3 g/10 min or less, such as about 2 g/10 min or less, such as about 1.5 g/10 min or less, such as about 1 g/10 min or less, such as about 0.8 g/10 min or less, such as about 0.6 g/10 min or less, such as about 0.5 g/10 min or less, such as about 0.45 g/10 min or less, such as about 0.4 g/10 min or less, such as about 0.35 g/10 min or less, such as about 0.3 g/10 min or less. The melt flow rate may be determined according to ASTM D1238-13 when subjected to a load of 2.16 kg in 10 minutes at a temperature of 230° C.

The polyolefin polymer may also have a particular heat of fusion. For instance, the heat of fusion may be about 40 J/g or more, such as about 50 J/g or more, such as about 60 J/g or more, such as about 70 J/g or more, such as about 75 J/g or more, such as about 80 J/g or more, such as about 90 J/g or more, such as about 100 J/g or more, such as about 125 J/g or more, such as about 150 J/g or more, such as about 200 J/g or more. The heat of fusion may be about 300 J/g or less, such as about 250 J/g or less, such as about 200 J/g or less, such as about 150 J/g or less, such as about 125 J/g or less, such as about 100 J/g or less, such as about 80 J/g or less, such as about 75 J/g or less, such as about 70 J/g or less, such as about 65 J/g or less, such as about 60 J/g or less, such as about 50 J/g or less. For instance, a polyolefin homopolymer may have a relatively higher heat of fusion while a polyolefin copolymer elastomer may have a relatively lower heat of fusion.

The polyolefin polymer may also have a particular crystallinity. For instance, the crystallinity may be 50% or more, such as 60% or more, such as 70% or more, such as 80% or more, such as 90% or more. In general, the percentage is used to define the weight of crystallized area per polymer total weight and can be determined using means in the art, such as a differential scanning calorimeter, an x-ray diffractometer (XRD), etc. In addition, the polyolefin polymer may have an isotacticity of 95% or more, such as 96% or more, such as 97% or more. Further, the polyolefin polymer may have an atactic fraction of 5% or less, such as 4% or less, such as 3% or less.

The polyolefin polymer may also have a particular flexural modulus. For instance, the flexural modulus in the machine direction may be about 50 MPa or more, such as about 100 MPa or more, such as about 200 MPa or more, such as about 300 MPa or more, such as about 400 MPa or more, such as about 500 MPa or more, such as about 1,000 MPa or more, such as about 1,300 MPa or more, such as about 1,500 MPa or more, such as about 2,000 MPa or more. The flexural modulus in the machine direction may be about 4,000 MPa or less, such as about 3,000 MPa or less, such as about 2,500 MPa or less, such as about 2,300 MPa or less, such as about 2,100 MPa or less, such as about 2,000 MPa or less, such as about 1,900 MPa or less, such as about 1,800 MPa or less, such as about 1,500 MPa or less, such as about 1,300 MPa or less, such as about 1,000 MPa or less, such as about 800 MPa or less. The flexural modulus may be determined according to ASTM D790-17 and 1.3 mm/min.

The polyolefin polymer may also have a particular deflection temperature under load ("DTUL"). For instance, the DTUL may be about 40° C. or more, such as about 45° C. or more, such as about 50° C. or more, such as about 60° C. or more, such as about 70° C. or more, such as about 80° C. or more. The DTUL may be about 130° C. or less, such as about 120° C. or less, such as about 110° C. or less, such as about 100° C. or less, such as about 90° C. or less, such as about 80° C. or less, such as about 75° C. or less. The DTUL may be determined according to ASTM D648-18 at 66 psi.

The polyolefin polymer may also have a particular elongation at break. For instance, the elongation at break may be about 1,000% or less, such as about 800% or less, such as about 600% or less, such as about 500% or less, such as about 400% or less, such as about 300% or less, such as about 250% or less, such as about 200% or less, such as about 150% or less, such as about 100% or less, such as about 50% or less. The elongation at break may be about 0.5% or more, such as about 1% or more, such as about 2% or more, such as about 5% or more, such as about 10% or more, such as about 25% or more, such as about 50% or more, such as about 100% or more, such as about 250% or more, such as about 500% or more, such as about 750% or more. For instance, the elongation at break may be relatively higher for a polyolefin copolymer, such as a polyolefin copolymer elastomer, than a polyolefin homopolymer. The elongation at break may be determined according to ASTM D638-14.

Furthermore, it should be understood that polyolefin polymers as disclosed herein can be synthesized using any technique generally known in the art. For instance, the polymer can be synthesized using any known process utilizing catalysts, activators, reagents as generally known in the art. In this regard, the method for making or polymerizing the polyolefin polymer is not limited by the present invention.

B. Hydrocarbon Resin

The polymeric substrate as disclosed herein comprises a barrier layer including a polymeric material which also includes a hydrocarbon resin. In general, these hydrocarbon resins include those resins made from petroleum-based feedstocks. For example, these resins may be synthesized from fraction by-products of petroleum cracking. In particular, these hydrocarbon resins may generally include those resins produced by the hydrogenation of the resinous polymerization products obtained by the polymerization of mixed unsaturated monomers derived from the deep cracking of petroleum, as well as higher polymers obtained by polymerization and/or copolymerization of terpene hydrocarbons, which may be followed by hydrogenation under pressure.

The hydrocarbon resins may include, but are not limited to, aliphatic hydrocarbon resins, aromatic hydrocarbon resins, aliphatic/aromatic hydrocarbon resins, or a mixture thereof. For example, an aliphatic/aromatic hydrocarbon resin may be a partially hydrogenated aromatic hydrocarbon resin. Further, regarding the aliphatic hydrocarbon resins, they may be cycloaliphatic hydrocarbon resins. The hydrocarbon resin may in addition to the above or alternatively polyterpene resins, terpene-phenol resins, rosin esters, rosin acids, grafted resins, and mixtures thereof.

In one embodiment, the hydrocarbon resin may include an aliphatic, such as an at least partially hydrogenated aliphatic hydrocarbon resin. In another embodiment, the hydrocarbon resin may include an aliphatic/aromatic hydrocarbon resin, such as an at least partially hydrogenated aliphatic aromatic hydrocarbon resin. In a further embodiment, the hydrocarbon resin may include an aromatic resin, such as an at least partially hydrogenated aromatic hydrocarbon resin. In another further embodiment, the hydrocarbon resin may include a cycloaliphatic hydrocarbon resin, such as an at least partially hydrogenated cycloaliphatic resin. In another embodiment, the hydrocarbon resin may include a cycloaliphatic/aromatic hydrocarbon resin, such as an at least partially hydrogenated cycloaliphatic/aromatic hydrocarbon resin. In another further embodiment, the hydrocarbon resin may include a polyterpene resin, a terpene-phenol resin, a rosin ester, a rosin acid, a grafted resin, or a mixture thereof.

In this regard, the hydrocarbon resin may be an aromatic resin or a non-aromatic resin. In one embodiment, the hydrocarbon resin may be an aromatic resin. In another embodiment, the hydrocarbon resin may be a non-aromatic resin. For example, the hydrocarbon resin may be an aliphatic resin or an aliphatic/aromatic resin. Regardless, the hydrocarbon resin may have an aromatic content of 0 wt. % or more, such as about 1 wt. % or more, such as about 2 wt. % or more, such as about 5 wt. % or more, 10 wt. % or more, such as about 15 wt. % or more. The aromatic content may be less than 100 wt. %, such as about 90 wt. % or less, such as about 70 wt. % or less, such as about 60 wt. % or less, such as about 50 wt. % or less, such as about 40 wt. % or less, such as about 20 wt. % or less, such as about 15 wt. % or less, such as about 10 wt. % or less, such as about 5 wt. % or less, such as about 2 wt. % or less, such as about 1 wt. % or less, such as about 0.5 wt. % or less. In one embodiment, the hydrocarbon resin may have an aromatic content of 0 wt. %.

In general, the hydrocarbon resin may comprise a hydrocarbon resin produced by the polymerization of various monomers. For example, these may include dienes (e.g., linear dienes), aromatic monomers, and natural monomers. In general, some of these monomers may be derived from naphtha. The diene monomers may include a piperylene, such as 1,3-pentadiene, 2-methyl-2-butene, etc. The diene monomers may also include cyclopentadiene and dicyclopentadiene. In addition, the aromatic monomers may include but are not limited to, styrene (including derivatives thereof), indene (including derivatives thereof), and others from a $C_9$-aromatic naptha stream. As an example, the styrene aromatics may include styrene, derivatives of styrene, and substituted styrenes. Particular examples of aromatics may include styrene, alpha-methylstyrene, beta-methylstyrene, indene, methylindene, and vinyl toluene. The natural monomers may also include natural monomers such as terpenes such as alpha-pinene or beta-carene. Furthermore, it should be understood that these monomers may be used alone or in combination. In particular, one or more of the aromatic monomers and/or one or more of the natural monomers may be used in combination with the diene.

The hydrocarbon resins may be polymerized using any technique as generally known in the art. For instance, in the polymerization, a catalyst may generally be employed. The catalyst may include, but is not limited to, $AlCl_3$ and $BF_3$. The polymerization may also utilize other modifiers or reagents. For example, the polymerization may utilize weight control modifiers to control the molecular weight distribution of the hydrocarbon resin. These may include, but are not limited to, mono-olefin modifiers such as 2-methyl, 2-butene, and the like. They may also be used to control the MWD of the final resin.

Specific examples of commercially available hydrocarbon resins include rosins and rosin esters, phenol modified styrene and methyl styrene resins, styrenated terpene resins, terpene-aromatic resins, terpene phenolic resins, aliphatic aromatic resins, cycloaliphatic/aromatic resins, $C_5$ aliphatic resins, $C_9$ aliphatic resins, $C_9$ aromatic resins, $C_9$ aliphatic/aromatic resins, acid modified $C_5$ resins, $C_5/C_9$ resins, and acid modified $C_5/C_9$ resins, mixed aromatic/cycloaliphatic resins, hydrogenated terpene aromatic resins, and mixtures thereof. In one particular embodiment, the hydrocarbon resin may include a $C_9$ resin, such as an aromatic $C_9$ resin.

In addition, it should be understood that some of these resins may be polymerized. For example, a $C_5$ monomer based resin may be a polymerization product of at least a $C_5$ monomer. Similar, a $C_9$ monomer based resin may be a polymerization product of at least a $C_9$ monomer. The $C_5$ monomers may include, for example, 1-pentene, isoprene, cyclopentadiene, 1,3-pentadiene, or a mixture thereof. The $C_9$ monomers may include, for example, indene, vinyl-toluene, α-methylstyrene, β-methylstyrene, or a mixture thereof.

Also, the hydrocarbon resin may be hydrogenated. For instance, the hydrocarbon resin may be partially, substantially, or fully hydrogenated. For instance, in one embodiment, the hydrocarbon resin may be at least partially hydrogenated. In another embodiment, the hydrocarbon resin may be substantially hydrogenated. In a further embodiment, the hydrocarbon may be fully hydrogenated. In this regard, as used herein, "at least partially hydrogenated" means that the resin may contain less than 90% olefinic protons, such as less than 80% olefinic protons, such as less than 70% olefinic protons, such as less than 60% olefinic protons, such as less than 50% olefinic protons, such as less than 40% olefinic protons, such as less than 30% olefinic protons, such as less than 25% olefinic protons and may contain 5% or more olefinic protons, such as 10% or more olefinic protons, such as 15% or more olefinic protons, such as 20% or more olefinic protons, such as 25% or more olefinic protons, such as 30% or more olefinic protons. In addition, as used herein, "substantially hydrogenated" means that the resin may contain less than 5% olefinic protons, such as less than 4% olefinic protons, such as less than 3% olefinic protons, such as less than 2% olefinic protons and may contain 0.1% or more olefinic protons, such as 0.5% or more olefinic protons, such as 0.8% or more olefinic protons, such as 1% or more olefinic protons, such as 1.5% or more olefinic protons, such as 2% or more olefinic protons.

Regarding hydrogenation, the degree of hydrogenation may be 50% or more, such as 60% or more, such as 70% or more, such as 80% or more, such as 85% or more, such as 90% or more, such as 95% or more, such as 96% or more, such as 97% or more, such as 98% or more, such as 99% or more, such as 100%. The degree of hydrogenation may be 100% or less, such as 99% or less, such as 98% or less, such as 95% or less, such as 90% or less, such as 85% or less, such as 80% or less, such as 75% or less. Without intending to be limited by theory, the degree of hydrogenation may impact the barrier properties. For instance, a higher degree of hydrogenation may improve the barrier properties of the material and resulting layer/film.

In one embodiment, the hydrocarbon resin may comprise one or more oligomers. For instance, such oligomers may include a dimer, a trimer, a tetramer, a pentamer, and/or a hexamer. The oligomers may be derived from a petroleum distillate boiling in the range of 30° C. to 210° C. and/or may be a byproduct of resin polymerization. The oligomer may have a number average molecular weight of about 100 g/mol or more, such as about 115 g/mol or more, such as about 130 g/mol or more, such as about 150 g/mol or more, such as about 175 g/mol or more, such as about 200 g/mol or more to about 500 g/mol or less, such as about 450 g/mol or less, such as about 400 g/mol or less, such as about 350 g/mol or less, such as about 300 g/mol or less, such as about 270 g/mol or less, such as about 250 g/mol or less, such as about 225 g/mol or less. The molecular weight may be determined using techniques known in the art, such as gel permeation chromatography.

These oligomers may include, but are not limited to, oligomers of cyclopentadiene, oligomers of substituted cyclopentadiene, oligomers of cyclopentadiene and substituted cyclopentadiene, oligomers of $C_4$-$C_6$ conjugated diolefins, oligomers of $C_8$-$C_{10}$ aromatic olefins, and combinations thereof. Furthermore, other monomers may also be present and may include $C_4$-$C_6$ mono-olefins, terpenes, and/or aromatic monomers. Furthermore, as indicated above, it should be understood that such oligomers may be at least partially hydrogenated or substantially hydrogenated.

In one particular embodiment, the hydrocarbon resin may be one derived from a cyclopentadiene. In this regard, the hydrocarbon resin may be a polycyclopentadiene. For instance, the hydrocarbon resin may be one produced by the polymerization (e.g., thermal polymerization) of a cyclopentadiene. For instance, the polymerization may be of cyclopentadiene (e.g., unsubstituted cyclopentadiene), a substituted cyclopentadiene, dicyclopentadiene, methylcyclopentadiene, or a mixture thereof. Such resin may also further include aliphatic or aromatic monomers as described herein. Such cyclopentadienes may be present in the hydrocarbon resin in an amount of 50 wt. % or more, such as about 60 wt. % or more, such as about 70 wt. % or more, such as about 80 wt. % or more, such as about 85 wt. % or more, such as about 90 wt. % or more, such as about 93 wt. % or more of the hydrocarbon resin. The cyclopentadienes may constitute less than 100 wt. %, such as about 99.5 wt. % or less, such as about 99 wt. % or less, such as about 98 wt. % or less, such as about 97 wt. % or less, such as about 95 wt. % or less, such as about 90 wt. % or less of the hydrocarbon resin.

In one particular embodiment, dicyclopentadiene may constitute a majority of the cyclopentadienes utilized in forming the hydrocarbon resin. In this regard, the dicyclopentadiene may constitute at least 50 wt. %, such as at least 60 wt. %, such as at least 70 wt. %, such as at least 80 wt. %, such as at least 85 wt. %, such as at least 90 wt. % to 100 wt. % or less, such as about 99 wt. % or less, such as about 97 wt. % or less, such as about 95 wt. % or less, such as about 90 wt. % or less of the cyclopentadienes utilized in the hydrocarbon resin. Furthermore, the aforementioned weight percentages may also apply to the total amount of dicyclopentadiene present in the hydrocarbon resin.

As indicated herein, the hydrocarbon resin may include a styrene. In this regard, the styrenic monomer may be utilized in an amount of at least 1 wt. %, such as at least 5 wt. %, such as at least 10 wt. % to 30 wt. % or less, such as 20 wt. % or less, such as 15 wt. % or less, such as 10 wt. % or less, such as 5 wt. % or less in the hydrocarbon resin. In one embodiment, the hydrocarbon resin may be substantially free of a styrenic monomer. For instance, it may be present in an amount of less than 1 wt. %, such as less than 0.5 wt. %, such as less than 0.1 wt. %, such as 0 wt. %.

As also indicated herein, the hydrocarbon resin may include an indene. In this regard, the indenic monomer may be utilized in an amount of at least 1 wt. %, such as at least 5 wt. %, such as at least 10 wt. % to 30 wt. % or less, such as 20 wt. % or less, such as 15 wt. % or less, such as 10 wt. % or less, such as 5 wt. % or less in the hydrocarbon resin. In one embodiment, the hydrocarbon resin may be substantially free of an indenic monomer. For instance, it may be present in an amount of less than 1 wt. %, such as less than 0.5 wt. %, such as less than 0.1 wt. %, such as 0 wt. %.

The hydrocarbon resin may have a certain viscosity as determined in accordance with ASTM D3236-15 at a temperature of 160° C. using a Brookfield viscometer and a size 21 spindle. The viscosity may be about 500 centipoise or more, such as about 700 centipoise or more, such as about 1,000 centipoise or more, such as about 1,500 centipoise or more, such as about 2,000 centipoise or more, such as about 3,000 centipoise or more, such as about 5,000 centipoise or more, such as about 8,000 centipoise or more, such as about 10,000 centipoise or more, such as about 13,000 centipoise or more, such as about 15,000 centipoise or more, such as about 18,000 centipoise or more, such as about 20,000 centipoise or more. The viscosity may be about 100,000 centipoise or less, such as about 80,000 centipoise or less, such as about 60,000 centipoise or less, such as about 50,000 centipoise or less, such as about 30,000 centipoise or less, such as about 25,000 centipoise or less, such as about 20,000 centipoise or less, such as about 17,000 centipoise or less, such as about 15,000 centipoise or less, such as about 12,000 centipoise or less, such as about 10,000 centipoise or less, such as about 7,000 centipoise or less, such as about 5,000 centipoise or less, such as about 4,000 centipoise or less, such as about 3,000 centipoise or less, such as about 2,000 centipoise or less, such as about 1,500 centipoise or less, such as about 1,000 centipoise or less, such as about 900 centipoise or less, such as about 800 centipoise or less, such as about 750 centipoise or less, such as about 700 centipoise or less, such as about 650 centipoise or less, such as about 625 centipoise or less, such as about 600 centipoise or less, such as about 550 centipoise or less.

The hydrocarbon resin may also have a certain molecular weight. For instance, the hydrocarbon resin may have a weight average molecular weight of about 200 g/mol or more, such as about 300 g/mol or more, such as about 400 g/mol or more, such as about 500 g/mol or more, such as about 600 g/mol or more, such as about 700 g/mol or more, such as about 800 g/mol or more, such as about 1,000 g/mol or more, such as about 1,200 g/mol or more, such as about 1,300 g/mol or more, such as about 1,500 g/mol or more, such as about 1,700 g/mol or more. The weight average molecular weight may be about 5,000 g/mol or less, such as about 4,000 g/mol or less, such as about 3,000 g/mol or less, such as about 2,500 g/mol or less, such as about 2,300 g/mol or less, such as about 2,000 g/mol or less, such as about 1,800 g/mol or less, such as about 1,600 g/mol or less, such as about 1,500 g/mol or less, such as about 1,400 g/mol or less, such as about 1,200 g/mol or less, such as about 1,000 g/mol or less, such as about 800 g/mol or less, such as about 700 g/mol or less, such as about 600 g/mol or less. The molecular weight may be determined using techniques known in the art, such as gel permeation chromatography.

Similarly, the hydrocarbon resin may have a number average molecular weight of about 200 g/mol or more, such as about 300 g/mol or more, such as about 400 g/mol or more, such as about 500 g/mol or more, such as about 600 g/mol or more, such as about 700 g/mol or more, such as about 800 g/mol or more, such as about 1,000 g/mol or more, such as about 1,200 g/mol or more, such as about 1,300 g/mol or more, such as about 1,500 g/mol or more, such as about 1,700 g/mol or more. The number average molecular weight may be about 5,000 g/mol or less, such as about 4,000 g/mol or less, such as about 3,000 g/mol or less, such as about 2,500 g/mol or less, such as about 2,300 g/mol or less, such as about 2,000 g/mol or less, such as about 1,800 g/mol or less, such as about 1,600 g/mol or less, such as about 1,500 g/mol or less, such as about 1,400 g/mol or less, such as about 1,200 g/mol or less, such as about 1,000 g/mol or less, such as about 800 g/mol or less, such as about 700 g/mol or less, such as about 600 g/mol or less. In this regard, the hydrocarbon resin may have a polydispersity index of about 1 or more, such as about 1.2 or more, such as about 1.5 or more, such as about 1.6 or more, such as about 1.7 or more, such as about 1.8 or more, such as about 1.9 or more, such as about 2 or more, such as about 2.3 or more, such as about 2.5 or more to about 20 or less, such as about 10 or less, such as about 8 or less, such as about 5 or less, such as about 4.5 or less, such as about 4 or less, such as about 3.5 or less, such as about 3 or less. The molecular weight may be determined using techniques known in the art, such as gel permeation chromatography.

In this regard, in one embodiment, the hydrocarbon resin may be considered a low molecular weight hydrocarbon resin. In one particular embodiment, the hydrocarbon resin may be considered a high molecular weight hydrocarbon resin.

In addition, the hydrocarbon resin may have a particular glass transition temperature. For instance, the glass transition temperature may be about 0° C. or more, such as about 20° C. or more, such as about 30° C. or more, such as about 40° C. or more, such as about 50° C. or more, such as about 60° C. or more, such as about 70° C. or more, such as about 80° C. or more, such as about 100° C. or more. The glass transition temperature may be about 250° C. or less, such as about 200° C. or less, such as about 180° C. or less, such as about 160° C. or less, such as about 150° C. or less, such as about 130° C. or less, such as about 100° C. or less, such as about 90° C. or less, such as about 80° C. or less, such as about 60° C. or less. The glass transition temperature may be determined using techniques known in the art, such as differential scanning calorimetry.

Further, the hydrocarbon resin may have a particular flash point. For instance, the flash point temperature may be about 100° C. or more, such as about 125° C. or more, such as about 150° C. or more, such as about 175° C. or more, such as about 190° C. or more, such as about 200° C. or more, such as about 210° C. or more, such as about 215° C. or more, such as about 220° C. or more, such as about 230° C. or more. The flash point temperature may be about 400° C. or less, such as about 350° C. or less, such as about 300° C. or less, such as about 280° C. or less, such as about 260° C. or less, such as about 250° C. or less, such as about 240° C. or less, such as about 230° C. or less. The flash point temperature may be determined using techniques known in the art, such as in accordance with ASTMD92-90.

Also, the hydrocarbon resin may have a particular ring and ball softening point, as determined according to ASTM E-28 (Revision 1996) at a heating and cooling rate of 10° C./min. For example, the softening point may be about 0° C. or more, such as about 20° C. or more, such as about 40° C. or more, such as about 50° C. or more, such as about 60° C. or more, such as about 80° C. or more, such as about 100° C. or more, such as about 110° C. or more, such as about 115° C. or more, such as about 120° C. or more, such as about 125° C. or more. The softening point may be about 250° C. or less, such as about 225° C. or less, such as about 200° C. or less, such as about 180° C. or less, such as about 160° C. or less, such as about 150° C. or less, such as about 140° C. or less, such as about 130° C. or less, such as about 125° C. or less, such as about 120° C. or less.

In addition, the hydrocarbon resin may also have a particular aniline point, which is generally the minimum temperature at which equal volumes of aniline and the resin are miscible. Without intending to be limited by theory, the aniline point may provide an indication of the aromatic hydrocarbon content of the resin. For example, the aniline point may be about 0° C. or more, such as about 20° C. or more, such as about 40° C. or more, such as about 50° C. or more, such as about 60° C. or more, such as about 80° C. or more, such as about 100° C. or more, such as about 107° C. or more, such as about 110° C. or more, such as about 115° C. or more, such as about 120° C. or more, such as about 125° C. or more. The aniline point may be about 250° C. or less, such as about 225° C. or less, such as about 200° C. or less, such as about 180° C. or less, such as about 160° C. or less, such as about 150° C. or less, such as about 140° C. or less, such as about 130° C. or less, such as about 125° C. or less, such as about 120° C. or less. In general, equal volumes of aniline and the resin are stirred continuously and heated until the two merge to provide a homogeneous solution; then, the heating is stopped and the temperature at which both phases separate is recorded as the aniline point. The aniline point can be determined in accordance with ASTM D611-12.

C. Optional Additives

The barrier layer and polymeric material may include any additional additives as generally utilized in the art. Furthermore, the additional layers as defined herein may also include such additives. These additives may include, but are not limited to, nucleating agents, clarifiers, slip additives, anti-blocking additives (e.g., silica), colored pigments, UV stabilizers, antioxidants, light stabilizers, flame retardants, antistatic agents, biocides, viscosity-breaking agents, impact modifiers, plasticizers, fillers, reinforcing agents, lubricants, mold release agents, blowing agents, pearlizers, etc.

In one embodiment, a nucleating agent may be utilized. In general, the nucleating agent may have a molecular weight of about 1,000 g/mol or less, such as about 800 g/mol or less, such as about 500 g/mol or less, such as about 300 g/mol or less, such as about 200 g/mol or less. In general, the nucleating agent may be utilized to decrease the crystallization time of a thermoplastic material. The nucleating agents may include, but are not limited to, sodium benzoate, talc, glycerol alkoxide salts, cyclic carboxylic acid salts, bicyclic carboxylic acid salts, glycerolates, phosphines, phosphates, hexahydrophtalic acid salts, sugar alcohols (e.g., mannitol or mannitol based compounds, sorbitol or sorbitol based compounds, nonitol or nonitol based compounds such as 1,2,3-trideoxy-4,6:5,7-bis-0-((4-propylphenyl) methylene) nonitol, etc.), etc. For instance, the phosphines may include a salt, such as a sodium salt, of 2,4,8,10-tetra(tert-butyl)-6-hydroxy-12H-dibenzo[d,g][1,3,2] dioxaphosphocin 6-oxide. The phosphates may include hydroxy-bis[2,2'-methylenebis[4,6-di(tert-butyl)phenyl] phosphate, 2,2'-methylenebis(4,6-di-tert-butylphenyl)phosphate, a salt thereof, or a mixture thereof. For instance, the salt may be an aluminum salt, a lithium salt, a sodium salt, or a mixture thereof. Other nucleating agents may include, but are not limited to diols (e.g., (1R)-1-[(4R,4aR,8aS)-2,6-bis(3,4-dimethylphenyl)-4,4a,8,8a-tetrahydro-[1,3]dioxino[5,4-d][1,3]dioxin-4-yl]ethane-1,2-diol, 1-[8-propyl-2,6-bis(4-propylphenyl)-4,4a,8,8a-tetrahydro-[1,3]dioxino[5,4-d][1,3]dioxin-4-yl]ethane-1,2-diol, etc.), amides (e.g., N-[3,5-bis(2,2-dimethylpropanoylamino)phenyl]-2,2-dimethylpropanamide), a salt, such as a calcium salt, of (1S,2R)-cyclohexane-1,2-dicarboxylate with zinc octadecenoate, and/or cis-endo-bicyclo[2,2,1]heptane-2,3-dicarboxylic acid disodium salt with 13-docosenamide, (Z)- and amorphous silicon dioxide. In one particular embodiment, the nucleating agent may include at least one bicyclic carboxylic acid salt, such as a bicycloheptane dicarboxylic acid, disodium salt such as bicyclo [2.2.1] heptane dicarboxylate. For instance, the nucleating agent may include a blend of bicyclo [2.2.1] heptane dicarboxylate, disodium salt, 13-docosenamide, and amorphous silicon dioxide. In another embodiment, the nucleating agent may include a cyclohexanedicarboxylic acid, calcium salt or a blend of cyclohexanedicarboxylic acid, calcium salt, and zinc stearate.

In one embodiment, one of the layers and/or polymeric material may include a nucleating agent, a slip additive, an anti-blocking additive, or a mixture thereof. For instance, in one embodiment, the additive may include at least a nucleating agent. In another embodiment, the additive may include at least a slip additive. In a further embodiment, the additive may include at least an anti-blocking additive. In another further embodiment, the additive may include a mixture of at least two of a nucleating agent, a slip additive, and an anti-blocking additive. In another embodiment, the additive may include a mixture of a nucleating agent, a slip additive, and an anti-blocking additive.

The layers and/or polymeric material may include such additives in an amount of about 20 wt. % or less, such as about 15 wt. % or less, such as about 10 wt. % or less, such as about 8 wt. % or less, such as about 5 wt. % or less, such as about 4 wt. % or less, such as about 3 wt. % or less, such as about 2 wt. % or less, such as about 1 wt. % or less, such as about 0.5 wt. % or less, such as about 0.3 wt. % or less, such as about 0.1 wt. % or less, such as 0 wt. %. The additive may be provided in an amount of about 0.001 wt. % or more, such as about 0.005 wt. % or more, such as about 0.01 wt. % or more, such as about 0.05 wt. % or more, such as about 0.1 wt. % or more, such as about 0.5 wt. % or more. In this regard, it should be understood that such additives may not be present within a layer in one embodiment.

D. Layer Configuration

The barrier layer including the polyolefin polymer, such as the propylene polymer, and the hydrocarbon resin is utilized in a polymeric substrate, which may form at least part of a shaped polymeric article. In this regard, the polymeric substrate may be a monolayer polymeric substrate or a multilayer polymeric substrate. For instance, in one embodiment, the polymeric substrate may be a monolayer polymeric substrate consisting of the aforementioned barrier layer including the polyolefin polymer and the hydrocarbon resin. Alternatively, the polymeric substrate may be a multilayer polymeric substrate including the aforementioned barrier layer including the polyolefin polymer and the hydrocarbon resin and at least one additional layer.

Regardless, the polyolefin polymer and the hydrocarbon resin may be incorporated into the barrier layer and/or polymeric material in particular amounts. For instance, the polyolefin polymer, such as the propylene polymer, may constitute about 40 wt. % or more, such as about 50 wt. % or more, such as about 60 wt. % or more, such as about 70 wt. % or more, such as about 80 wt. % or more of the weight of the barrier layer and/or polymeric material. The polyolefin polymer may constitute less than 100 wt. %, such as about 95 wt. % or less, such as about 90 wt. % or less, such as about 80 wt. % or less, such as about 75 wt. % or less, such as 70 wt. % or less, such as 60 wt. % or less of the weight of the barrier layer and/or polymeric material. Accordingly, the hydrocarbon resin may constitute about 5 wt. % or more, such as about 10 wt. % or more, such as about 15 wt. % or more, such as about 20 wt. % or more, such as about 25 wt. % or more, such as about 30 wt. % or more, such as about 35 wt. % or more of the weight of the barrier layer and/or polymeric material. The hydrocarbon resin may constitute about 50 wt. % or less, such as about 45 wt. % or less, such as about 40 wt. % or less, such as about 35 wt. % or less, such as about 30 wt. % or less, such as about 25 wt. % or less, such as about 20 wt. % or less, such as about 15 wt. % or less of the weight of the barrier layer and/or polymeric material.

Within these layers and the polymeric material, although not limited, certain combinations of the polyolefin polymer and hydrocarbon resin may be utilized. These may include the following: a polypropylene polymer, such as a high crystalline polypropylene polymer, and a $C_9$ aromatic hydrocarbon resin; a polypropylene polymer, such as a high crystalline polypropylene polymer, and a $C_5$ aromatic hydrocarbon resin; a polypropylene polymer, such as a high crystalline polypropylene polymer, and polycyclopentadiene; a polypropylene homopolymer and a $C_9$ aromatic hydrocarbon resin; a polypropylene homopolymer and a $C_5$ aromatic hydrocarbon resin; a polypropylene homopolymer and polycyclopentadiene; a random polypropylene copolymer and a $C_9$ aromatic hydrocarbon resin; a random polypropylene copolymer and a $C_5$ aromatic hydrocarbon resin; a random polypropylene copolymer and polycyclopentadiene; a high density polyethylene and a $C_9$ aromatic hydrocarbon resin; a high density polyethylene and a $C_5$ aromatic hydrocarbon resin; a high density polyethylene and polycyclopentadiene. In addition, as previously indicated, the hydrocarbon resin may be at least partially hydrogenated, such as a partially hydrogenated $C_9$ aromatic hydrocarbon resin. In addition, the hydrocarbon resin may be a fully hydrogenated hydrocarbon resin.

Furthermore, it should be understood that the barrier layer and/or polymeric material may include more than one polyolefin polymer. For instance, the polyolefin polymer may include a blend of polyolefin polymers. Such polyolefin polymers may be any as described herein.

When the polymeric substrate comprises a multilayer polymeric substrate, the number of additional layers is not necessarily limited. For instance, the polymeric substrate may include at least 2, such as at least 3, such as at least 4 additional layers. In general, the polymeric substrate may include less than 10, such as less than 8, such as less than 6, such as less than 5 additional layers. Such additional layers may be provided to form a laminated structure.

Each of the additional layers may include a polyolefin polymer as defined herein. For instance, the polyolefin polymer may be a polyolefin homopolymer, such as a propylene homopolymer. Alternatively, the polyolefin polymer may be a polyolefin copolymer, such as a propylene copolymer. In particular, the propylene copolymer may be a propylene copolymer elastomer. However, it should be understood that in certain embodiments, the propylene polymer may be a copolymer that may not be considered an elastomer.

Furthermore, it should be understood that such polyolefin polymer of the additional layers may be the same as or different from the polyolefin polymer of the polymeric material of the barrier layer. For instance, in one embodiment, the polyolefin polymer in at least one of the additional layers may be the same as the polyolefin polymer of the polymeric material of the barrier layer. However, in another embodiment, the polyolefin polymer of the additional layers is different from the polyolefin polymer of the polymeric material of the barrier layer.

In addition to the above, the barrier layer may be utilized within a multilayer material wherein the additional layers may include materials other than or in addition to the polyolefin polymer as disclosed herein. For instance, one example of a multilayer polymeric substrate may include a layer including ethylene vinyl alcohol, ethylene vinyl acetate, and/or a polyamide (e.g., nylon) along with the barrier layer as disclosed herein. In one embodiment, the multilayer polymeric substrate may include an additional tie layer or compatibilizing layer between the layer formed from the ethylene vinyl alcohol, the ethylene vinyl acetate, and/or the polyamide and the barrier layer including the polyolefin polymer as disclosed herein.

Similarly, it should be understood that the polyolefin polymer of the additional layers may also be the same or different. For instance, in one embodiment, the additional layers may include the same polyolefin polymer. In another embodiment, the additional layers may include different polyolefin polymers.

In one embodiment, the polymeric substrate comprises a multilayer polymeric substrate including the barrier layer and 2 additional layers. In this regard, the barrier layer may be sandwiched between the 2 additional layers. For instance, each of the additional layers directly contacts the barrier layer. In this regard, the additional layers may both include a polyolefin copolymer in one embodiment. In another embodiment, one of the additional layers may include a polyolefin copolymer (e.g., not an elastomer) while the other additional layer may include a polyolefin copolymer elastomer. In a further embodiment, the additional layers may both include a polyolefin copolymer elastomer.

In another embodiment, the polymeric substrate comprises a multilayer polymeric substrate including the barrier layer and 3 additional layers. In this regard, the barrier layer may be sandwiched between 2 of the additional layers wherein each of the 2 additional layers directly contacts the barrier layer. Furthermore, the $3^{rd}$ additional layer is placed adjacent to another one of the additional layers and may not directly contact the barrier layer. In this regard, as an example, the additional layers contacting the barrier layer may both include a polyolefin copolymer, such as one not considered an elastomer, and the $3^{rd}$ additional layer may also include a polyolefin copolymer, in particular a polyolefin copolymer elastomer.

In one embodiment, the polymeric substrate comprises a multilayer polymeric substrate including the barrier layer and 4 additional layers. In this regard, the barrier layer may be sandwiched between 2 of the additional layers wherein each of the 2 additional layers directly contacts the barrier layer. Furthermore, the $3^{rd}$ and $4^{th}$ additional layers are placed adjacent to another one of the additional layers and may not directly contact the barrier layer. In this regard, as an example, the additional layers contacting the barrier layer may both include a polyolefin copolymer, such as one not considered an elastomer, and the $3^{rd}$ and $4^{th}$ additional layers may also include a polyolefin copolymer, in particular a polyolefin copolymer elastomer.

Figure 2:
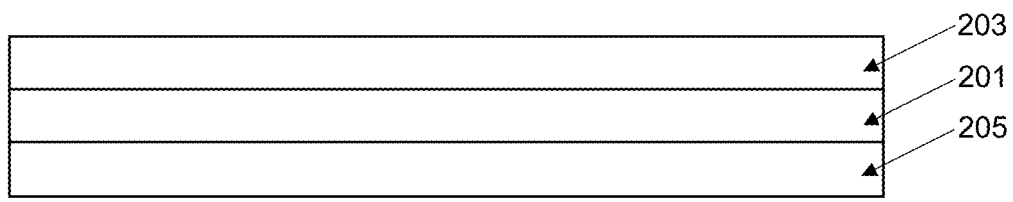
FIG. 2 is a side perspective view of a multilayer sheet including a barrier layer and 2 additional layers according to the present invention.
Figure 3:
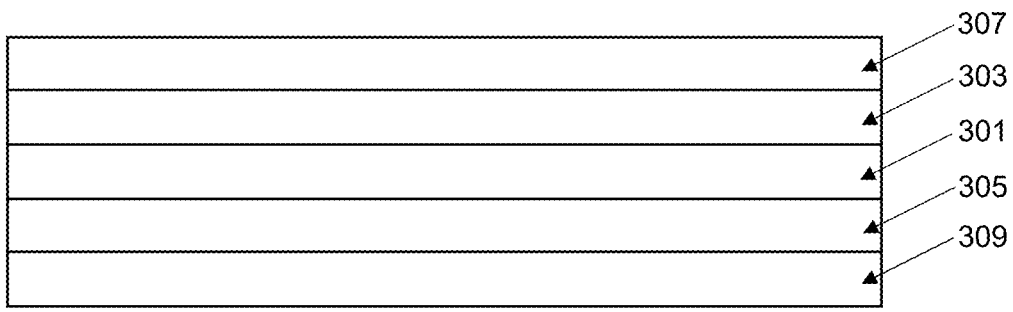
FIG. 3 is a side perspective view of a multilayer sheet including a barrier layer and 4 additional layers according to the present invention.

Turning to the figures, FIG. 1 provides an illustration of a monolayer polymeric substrate consisting of the aforementioned barrier layer 101 including the polymeric material comprising the polyolefin polymer and the hydrocarbon resin. Meanwhile, FIGS. 2 and 3 provide illustrations of multilayer polymeric substrates including the aforementioned barrier layer 201 and 301, respectively, including the polymeric material comprising the polyolefin polymer and the hydrocarbon resin. However, FIG. 2 includes 2 additional layers 203 and 205 that contact and sandwich the barrier layer 201. Meanwhile, FIG. 3 includes 4 additional layers 303, 305, 307, and 309 wherein layers 303 and 305 contact and sandwich the barrier layer 301 and layers 307 and 309 are on the opposite sides of layers 303 and 305. These additional layers may be as those defined herein.

While the aforementioned expressly provide some of the configurations of the additional layers and the barrier layer, it should be understood that other configurations and laminated structures may also be utilized so long as the polymeric substrate includes the barrier layer as defined herein.

In addition to the aforementioned layers, the polymeric substrate may also include other layers, such as those not including a polyolefin polymer. For instance, these may include sealing layers as generally known in the art. For instance, when the polyolefin polymer includes a propylene polymer, these layers may include a polyolefin (i.e., one other than a propylene polymer) and other materials, such as cellulosic materials (e.g., paper, wood, carboard), metals (e.g., foils such as aluminum foils, tin foils), metallized surfaces, glass coatings (e.g., including a silicon oxide), fabrics, spunbond fibers, and non-wovens as well as substrates coated with inks, dyes, pigments, and the like. In general, when such layers are employed, they may be employed on an outer surface of the polymeric substrate.

Furthermore, it should be understood that the respective additional layers may include about 10 wt. % or more, such as about 20 wt. % or more, such as about 30 wt. % or more, such as about 40 wt. % or more, such as about 50 wt. % or more, such as about 60 wt. % or more, such as about 70 wt. % or more, such as about 80 wt. % or more, such as about 90 wt. % or more, such as about 95 wt. % or more, such as 100 wt. % of the polyolefin polymer(s).

In one embodiment, at least one additional layer may include a hydrocarbon resin. If so, the hydrocarbon resin may be present in an amount of 0.01 wt. % or more, such as about 0.1 wt. % or more, such as about 0.2 wt. % or more, such as about 0.5 wt. % or more, such as about 1 wt. % or more, such as about 2 wt. % or more, such as about 5 wt. % or more to about 50 wt. % or less, such as about 40 wt. % or less, such as about 30 wt. % or less, such as about 25 wt. % or less, such as about 20 wt. % or less, such as about 15 wt. % or less, such as about 10 wt. % or less, such as about 8 wt. % or less, such as about 5 wt. % or less. However, it should be understood that a respective additional layer also may not include any of the hydrocarbon resin in another embodiment. For instance, the hydrocarbon resin may be present in an amount of about 0 wt. %.

Similarly, while the additional layers may include a polyolefin copolymer, they may not include a polyolefin copolymer elastomer, in particular a propylene copolymer elastomer, in one embodiment. For instance, the polyolefin copolymer elastomer may be present in an amount of less than about 20 wt. %, such as less than about 15 wt. %, such as less than about 10 wt. %, such as less than about 5 wt. %, such as less than about 1 wt. %, such as 0 wt. %.

As indicated above, the polymeric substrate may have a thickness as indicated above. In addition, when the polymeric substrate is a monolayer polymeric substrate that simply includes the barrier layer as defined herein, the aforementioned thicknesses may also apply to the barrier layer. For instance, the barrier layer may have a thickness of more than 200 µm, such as 210 µm or more, such as 220 µm or more, such as 240 µm or more, such as 250 µm or more, such as 300 µm or more, such as 500 µm or more, such as 700 µm or more, such as 900 µm or more, such as 1 mm or more, such as 2 mm or more, such as 3 mm or more, such as 5 mm or more. The polymeric substrate may have a thickness of 1.25 cm or less, such as 1 cm or less, such as 8 mm or less, such as 5 mm or less, such as 3 mm or less, such as 2 mm or less, such as 1 mm or less, such as 800 µm or less, such as 500 µm or less, such as 400 µm or less, such as 350 µm or less, such as 300 µm or less, such as 280 µm or less, such as 270 µm or less. However, it should be understood that such thicknesses may also apply to the barrier layer, for instance when incorporated in a multilayer polymeric substrate.

When the polymeric substrate is a multilayer polymeric substrate, the barrier layer may constitute a certain percentage of the thickness of the polymeric substrate. For instance, the barrier layer may constitute about 10% or more, such as about 20% or more, such as about 30% or more, such as about 40% or more, such as about 50% or more, such as about 60% or more, such as about 70% or more, such as about 80% or more, such as about 90% or more of the total thickness of the polymeric substrate. The barrier layer may constitute less than 100%, such as about 90% or less, such as about 80% or less, such as about 70% or less, such as about 60% or less, such as about 50% or less, such as about 40% or less, such as about 30% or less, such as about 20% or less of the total thickness of the polymeric substrate.

Similarly, each additional layer may also constitute a certain percentage of the thickness of the polymeric substrate. For instance, each respective additional layer may constitute about 5% or more, such as about 10% or more, such as about 20% or more, such as about 30% or more, such as about 40% or more, such as about 50% or more, such as about 60% or more, such as about 70% or more, such as about 80% or more, such as about 90% or more of the total thickness of the polymeric substrate. Each respective additional layer may constitute less than 100%, such as about 90% or less, such as about 80% or less, such as about 70% or less, such as about 60% or less, such as about 50% or less, such as about 40% or less, such as about 30% or less, such as about 20% or less, such as about 10% or less of the total thickness of the polymeric substrate.

When the multilayer polymeric substrate includes multiple additional layers, it should be understood that the respective additional layers may have the same thickness. However, it should also be understood that respective additional layers may also have a different thickness. In this regard, each of the respective additional layers may have a thickness that fills within the aforementioned percentages.

Furthermore, the thickness of such additional layers may be the same or different than that of the barrier layer. In certain embodiments, the thickness of the barrier layer may be greater than the thickness of at least one additional layer. For instance, the ratio of the thickness of the barrier layer to the thickness of the at least one additional layer may be greater than 1, such as about 1.2 or more, such as about 1.5 or more, such as about 2 or more, such as about 2.5 or more, such as about 3 or more, such as about 3.5 or more to about 10 or less, such as about 8 or less, such as about 6 or less, such as about 4 or less, such as about 3.5 or less, such as about 3 or less, such as about 2.5 or less, such as about 2 or less. In another embodiment, the thickness of the barrier layer may be less than the thickness of at least one additional layer. For instance, the ratio of the thickness of the barrier layer to the thickness of the at least one additional layer may be less than 1, such as about 0.9 or less, such as about 0.8 or less, such as about 0.7 or less, such as about 0.6 or less to about 0.1 or more, such as about 0.3 or more, such as about 0.4 or more, such as about 0.5 or more. In a further embodiment, the thickness of the barrier layer may be the same as the thickness of at least one additional layer such that the ratio of the thickness of the barrier layer to the thickness of the at least one additional layer is about 1.

In addition, the method of making the layers is not necessarily limited by the present invention. For instance, the layers may be formed using conventional techniques as known in the art. For example, the layers may be formed via various extrusion techniques, such as extrusion (e.g., co-extrusion), cast extrusion, etc. In particular, when the multiple layers are formed, the layers may be formed by coextruding the layers through a flat sheet extruder die at a relatively high temperature. For instance, the temperature may be about 150° C. or more, such as about 180° C. or more, such as about 200° C. or more to about 350° C. or less, such as about 300° C. or less, such as about 275° C. or less.

E. Shaped Polymeric Article

The polymeric substrate may form at least part of a shaped polymeric article. The polymeric substrate and resulting shaped polymeric article may be formed using various techniques known in the art. These techniques may include, but are not limited to, thermoforming, blow molding, injection molding, compression molding, rotomolding, etc. For example, in one embodiment, the polymeric substrate and resulting shaped polymeric article may be formed via thermoforming to create a thermoformed shaped polymeric article. In another embodiment, the polymeric substrate and resulting shaped polymeric article may be formed via blow molding to create a blow molded shaped polymeric article. In a further embodiment, the polymeric substrate and resulting shaped polymeric article may be formed via injection molding to create an injection molded shaped polymeric article. In another further embodiment, the polymeric substrate and resulting shaped polymeric article may be formed via compression molding to create a compression molded shaped polymeric article. It should be understood, however, that other processing techniques may also be utilized according to the present invention.

In one embodiment, the polymeric substrate and shaped polymeric article as disclosed herein may be formed by exposing the barrier layer and any additional layers as defined herein to a thermoforming process. Thermoforming generally involves heating the layer(s) to a certain temperature, shaping the layer(s) within a mold, and then optionally trimming the shaped polymeric article to create the desired article.

The particular forming technique is not critical, and any of a variety of conventional processes may be employed in the present invention. Suitable techniques may include, for instance, vacuum forming, plug assist forming, drape forming, press forming, etc. For example, the layer(s) may be fed to a heating device (e.g., convection oven, resistance heater, infrared heater, etc.) that heats it to a temperature sufficient to cause the polymer(s) to deform or stretch. This temperature may generally be above the glass transition temperature, yet at or below the melting temperature. For example, the thermoforming temperature may be about 10° C. or more, such as about 20° C. or more, such as about 30° C. or more, such as about 40° C. or more, such as about 45° C. or more to about 100° C. or less, such as about 80° C. or less, such as about 60° C. or less below the melting temperature. For example, the layer(s) may be heated to a temperature of from about 30° C. or more, such as about 40° C. or more, such as about 50° C. or more, such as about 60° C. or more to about 200° C. or less, such as about 150° C. or less, such as about 130° C. or less, such as about 120° C. or less, such as about 110° C. or less. Once heated, the layer(s) may then be fed to a mold where a force (e.g., suctional force) is placed against the layer(s) to cause it to conform to the contours of the mold. The mold cavity imparts the shape of the article to the layer(s) and can also cool the material to a temperature significantly below the melting point so that it solidifies adequately to retain its shape upon removal from the mold.

Figure 4:
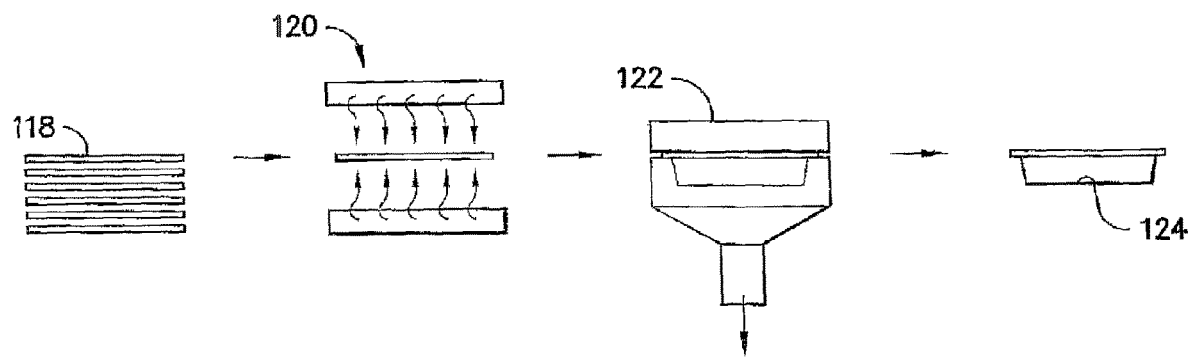
FIG. 4 is a side view of a thermoforming process that may be employed in one embodiment of the present invention.

Turning to the figures, FIG. 4 illustrates an example thermoforming process that may be utilized. As illustrated, the layers 118 are fed to a heating device 120 that heats the layers to a temperature sufficient to cause the layers to deform. As indicated above, any of a variety of heating devices may be employed in the thermoforming process. Once heated, the layers 118 are fed to a molding device 122 where they are molded into an article. As indicated above, any of a variety of molding devices may be employed in the thermoforming process. The layers may then conform to the contours of the mold resulting in the polymeric substrate and shaped polymeric article 124. While FIG. 4 depicts multiple layers, it should be understood that thermoforming may be utilized also with a single layer, such as just the barrier layer as disclosed herein. In addition, thermoforming applications may also encompass form, fill, and seal applications as generally known in the art.

In another embodiment, the shaped polymeric article may be a blow molded shaped polymeric article. Blow molded articles may be formed using extrusion blow molding, injection blow molding, or injection stretch blow molding techniques. Regardless of the method, blow molding generally involves providing a polymeric material into a hollow mold cavity, shaping the material within the mold by blowing air, and then optionally trimming the shaped polymeric article to create the desired article. For instance, a polymeric material including the aforementioned components of the barrier layer (i.e., polyolefin polymer, hydrocarbon resin, and optional additives) may be provided directly into a hollow mold cavity. Once inserted, the mold closes and the parison is gripped into place. Then, a nozzle or pin may be inserted into an open end of the parison to introduce air which inflates the parison into the shape of the mold. The mold temperature may be about 0° C. or more, such as about 5° C. or more, such as about 10° C. or more, such as about 20° C. or more, such as about 30° C. or more, such as about 40° C. or more, such as about 45° C. or more than the melting temperature of the material. The mold temperature may be about 90° C. or less, such as about 85° C. or less, such as about 80° C. or less than the melting temperature of the material. In one embodiment, the mold temperature may be greater than 0° C. up to the crystalline temperature of the material. In certain embodiments, for example, the layer(s) may be heated to a temperature of from about 30° C. to about 150° C., in some embodiments from about 50° C. to about 130° C., and in some embodiments, from about 60° C. to about 120° C. within the mold until the layer(s) have taken shape. The mold cavity imparts the shape of the article to the layer(s) and can also cool the material to a temperature significantly below the melting point so that it solidifies adequately to retain its shape upon removal from the mold. In addition, cool air may be introduced into the mold to solidify the polymers. Once the layer(s) have taken shape, the mold is opened and the shaped polymeric article is allowed to be removed. Then, optionally, the shaped polymeric article is trimmed as necessary to create the desired article.

Figure 5:
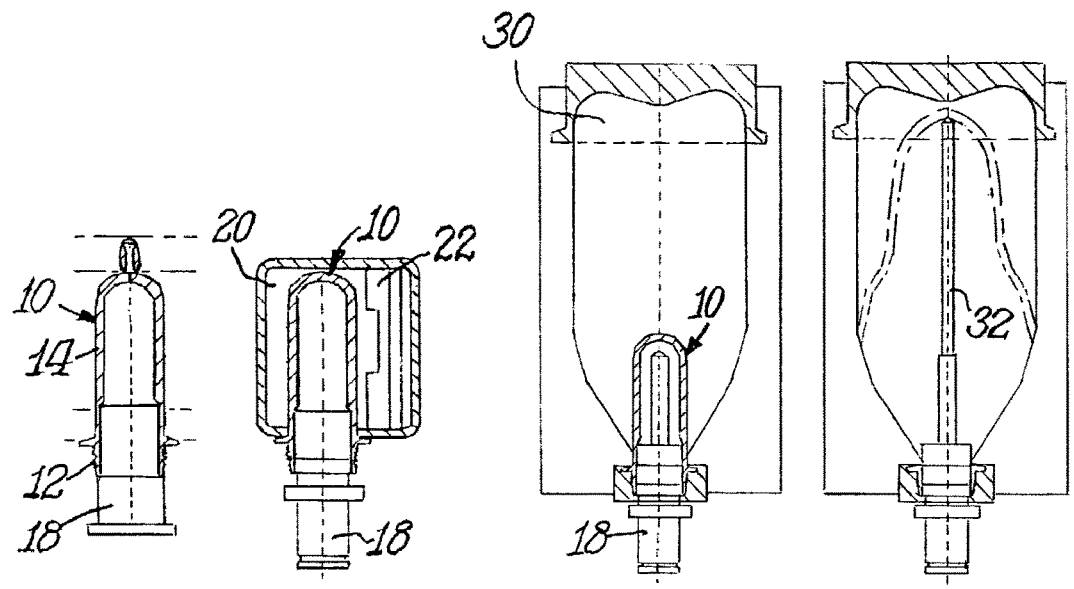
FIG. 5 is a side view of a blow molding process that may be employed in one embodiment of the present invention.

One example of a blow molding process, in particular an injection stretch blow molding process, is illustrated in FIG. 5 for forming a bottle. Initially, an injection molded preform 10 having a threaded neck portion 12 and a bottle body portion 14 is installed over a fixture 18 and held within a reheating or preheating cavity 20. A heating lamp 22, which may include one more lamps, heats (e.g., using infrared radiation) the outer surface of the preform 10 as it is rotated on the fixture 18. The reheating may be conducted on outside of the preform, the inside of the preform, or from both the outside and the inside of the preform. Then, the fixture 18 with the reheated preform 10 is held within a mold cavity 30 having the contours to mold the material into a desired shape, such as a bottle. While this figure illustrates a mold cavity for a bottle, it should be understood that other mold cavities for forming other types of shaped articles may also be utilized. A gas, such as air or nitrogen, is injected into the internal volume of the preform 10 through a nozzle in the fixture 18 as a push rod 32 urges the material to expand outwardly to conform to the internal contours of the mold. Finally, once the process has been completed, the article can be removed from the mold.

Figure 6:
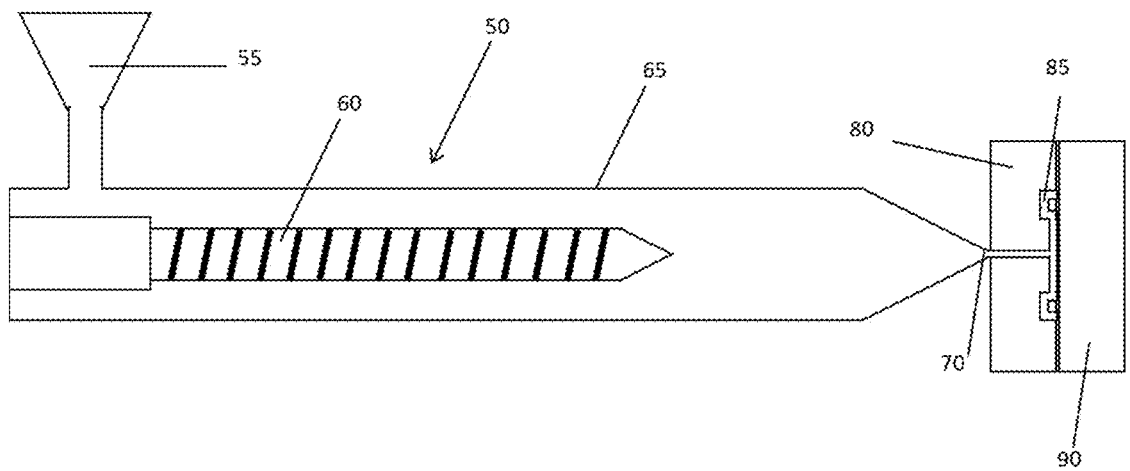
FIG. 6 is a side view of an injection molding process that may be employed in one embodiment of the present invention.

Another processing technique that may be utilized according to the present injection is injection molding as illustrated in FIG. 6. In general, forming injection molded articles involves plasticization or heating of a polymeric material, injection of the material into a mold, packing the mold with the polymeric material, cooling the article, and demolding/ejection of the article. For example, referring to FIG. 6, the material is typically provided to the injection molding apparatus 50 through feeding device 55, such as a hopper. Once inside the barrel 65 of the apparatus, the material is heated using heating devices (not shown) and mixed using a screw 60, which also helps provide the material through nozzle 70 into the mold 85. The apparatus 50 can include a stationary part 80 and a movable part 90. As illustrated, the mold 85 is provided such that it is formed between stationary part 80 and movable part 90. Once the material fills the mold 85, the material is then allowed to cool and solidify. Next, the movable part 90 is separated from the stationary part 80 thereby allowing the injection molded article to be demolded.

Depending on the processing technique utilized, the polymeric substrate and shaped polymeric article may be monolayer or multilayer. In one embodiment, the polymeric substrate and shaped polymeric article may be monolayer. In another embodiment, the polymeric substrate and shaped polymeric article may be multilayer. For example, multilayer substrates and articles may be formed using thermoforming. Alternatively, monolayer substrates and articles may be formed using thermoforming, blow molding, or injection molding. Furthermore, with the above processing techniques, in some embodiments, the substrate and article disclosed herein may be non-oriented.

Furthermore, by utilizing the polyolefin polymer and the hydrocarbon resin as disclosed herein, the resulting substrate and barrier layer and/or polymeric material may undergo minimal mold shrinkage. For instance, the mold shrinkage may be 10% or less, such as 8% or less, such as 6% or less, such as 5% or less, such as 4% or less, such as 3% or less, such as 2.5% or less, such as 2% or less, such as 1.8% or less, such as 1.6% or less, such as 1.5% or less, such as 1.4% or less, such as 1.3% or less, such as 1.2% or less, such as 1.1% or less, such as 1% or less. The mold shrinkage may be 0.01% or more, such as 0.05% or more, such as 0.1% or more, such as 0.3% or more, such as 0.5% or more, such as 0.8% or more, such as 1% or more, such as 1.1% or more, such as 1.3% or more, such as 1.5% or more. Such mold shrinkage may be in the flow direction in one embodiment. In another embodiment, such mold shrinkage may be in the cross-flow direction. In a further embodiment, such mold shrinkage may be in the flow direction and the cross-flow direction.

With the mold shrinkage and mechanical properties as disclosed herein, the polymeric substrate and barrier layer may mimic other polymers, such as polystyrene, with its performance and attributes thereby allowing for these materials to be used in a wide variety of applications, some of which are provided herein. In particular, the material as disclosed herein may generally exhibit a flexural modulus, as well as other mechanical properties, that mimic other polymers in particular polystyrene.

As indicated above, the shaped polymeric article may have an average final wall thickness of more than 200 µm, such as 210 µm or more, such as 220 µm or more, such as 240 µm or more, such as 250 µm or more, such as 300 µm or more, such as 500 µm or more, such as 700 µm or more, such as 900 µm or more, such as 1 mm or more, such as 3 mm or more, such as 5 mm or more. The shaped polymeric article may have an average final wall thickness of 1.25 cm or less, such as 1 cm or less, such as 8 mm or less, such as 5 mm or less, such as 3 mm or less, such as 2 mm or less, such as 1 mm or less, such as 800 µm or less, such as 500 µm or less, such as 400 µm or less, such as 350 µm or less, such as 300 µm or less, such as 280 µm or less, such as 270 µm or less. Such average thickness may be obtained by obtaining an average of each wall thickness of the shaped polymeric article.

Regardless of the technique utilized, the polymeric substrate including the barrier layer may be shaped or utilized for a wide variety of different three-dimensional articles. For example, the resulting article may be a packaging product for the food, medical, or general retail industries, such as a package, cup, tub, pail, jar, box, container, lid, tray (e.g., for a food article), blister, clamshell, bottle, pouch, appliance part (e.g., refrigerator liner), pallet, etc.; automotive or aircraft part, such as a dash panel, door panel, utility vehicle bed, etc.; and so forth. In one particular embodiment, the shaped polymeric article may be a packaging article, such as a food packaging article. In particular, because of the materials utilized within the polymeric substrate and barrier layer, the substrate and layer may also pass U.S. Food and Drug Administration guidelines and compliance, in particular for use as a food packaging article.

Furthermore, even with the materials utilized with the polyolefin polymer as disclosed herein, the barrier layer and resulting polymeric substrate may also be recyclable. For instance, when the polyolefin polymer is a polypropylene, utilization of the specific materials as disclosed herein can still allow for the barrier layer and resulting polymeric substrate to be coded as a Class 5 material for recycling purposes.

While embodiments of the present disclosure have been generally discussed, the present disclosure may be further understood by the following, non-limiting examples.

EXAMPLES

Test Methods

Water Vapor Transmission Rate: The water vapor transmission rate may be determined in accordance with ASTM F1249-13.

Oxygen Transmission Rate: The oxygen transmission rate may be determined in accordance with ASTM D3985-17.

Deflection Temperature Under Load ("DTUL"): The deflection temperature under load may be determined in accordance with ISO Test No. 75-2:2013 (technically equivalent to ASTM D648-18). More particularly, a test strip sample having a length of 80 mm, thickness of 10 mm, and width of 4 mm may be subjected to an edgewise three-point bending test in which the specified load (maximum outer fibers stress) was 0.455 Megapascals. The specimen may be lowered into a silicone oil bath where the temperature is raised at 2° C. per minute until it deflects 0.25 mm (0.32 mm for ISO Test No. 75-2:2013).

Tensile Properties: Tensile properties may be determined according to ISO Test No. 527:2012 (technically equivalent to ASTM D638-14). More particularly, tensile modulus measurements may be made on a test strip sample having a length of 80 mm, thickness of 10 mm, and width of 4 mm. The testing temperature may be 23° C. and the testing speeds may be 1 or 5 mm/min.

Flexural Properties: Flexural properties (e.g., flexural tangent modulus, flexural secant modulus) were determined according to ASTM D790A. The test conditions were in accordance with ASTM D790A and the test speed was 1.3 mm/min.

Mold Shrinkage: Mold shrinkage provides a measure of the shrinkage of a polymer as it cools after molding. Mold shrinkage properties (e.g., flow and cross-flow) were determined according to ASTM D955-08. The test conditions and mold specifications were in accordance with ASTM D955-08.

Viscosity: The viscosity of the hydrocarbon resin may be determined according to ASTM D3236-15 at a temperature of 160° C. using a Brookfield viscometer and a size 21 spindle. Samples are loaded into a test chamber, allowed to melt, and equilibrate to a temperature of 160±0.5° C. The spindle is then added and the system is allowed to equilibrate for 30 minutes with the spindle rotating at the lowest setting (0.5 rpm). The speed can then be increased until the deflection was near 50%. Once the reading stabilized, the viscosity was measured. The spindle was allowed to rotate at least 5 times followed by a second reading and an additional 5 times followed by a third reading.

Melt Flow Rate: The melt flow rate may be determined in accordance with ASTM D1238B at a temperature of 230° C. and 2.16 kg.

Haze and Clarity: The percent haze and clarity may be determined in accordance with ASTM D1003.

Notched Izod Impact Strength: The Notched Izod impact strength may be determined in accordance with ASTM D256A at 23° C.

Gardner Impact Strength: The Gardner impact strength may be determined in accordance with ASTM D5420 at 23° C.

Example 1

In this example, a high crystallinity polypropylene ("HCPP") was modified using a $C_9$ cycloaliphatic hydrocarbon resin ("HCR") having a ring and ball softening point of at least 110° C. The polypropylene had a crystallinity of about 99% or more. For preparing the sample, the respective amounts of the components were blended and extruded within a temperature of from 370-500° F. Using this process, pellets were formed to prepare samples for analysis including the determination of flexural properties, tensile properties, and mold shrinkage properties.

| Property | HCPP | HCPP + 15 wt. % HCR | HCPP + 20 wt. % HCR | HCPP + 25 wt. % HCR |
|---|---|---|---|---|
| Flexural Tangent Modulus (MPa) | 2390 | 2990 | 3110 | 3100 |
| Flexural Secant Modulus (MPa) | 2210 | 2820 | 2960 | 3000 |
| Test Speed (mm/min) | 1.3 | 1.3 | 1.3 | 1.3 |
| Mold Shrinkage Cross Flow (%) | 2.3005 | 1.983 | 1.51 | 1.2645 |
| Mold Shrinkage Flow (%) | 2.025 | 1.374 | 1.1295 | 1.1835 |
| Tensile Strength at Yield (MPa) | 39.8 | 43.7 | 44 | 43.2 |
| Percent Elongation at Yield (%) | 4.03 | 2.54 | 2.14 | 1.9 |

As indicated in the table above, the mechanical properties (e.g., flexural properties and tensile strength at yield) improved with the addition of the hydrocarbon resin. Meanwhile, addition of the hydrocarbon resin resulted in a slight reduction in the percent elongation at yield. In addition, mold shrinkage data shows that the dimensions of the mold including the polymer with the hydrocarbon resin remain relatively the same upon cooling.

Example 2

In samples 2 and 3, a high crystallinity polypropylene ("HCPP") was modified using a $C_9$ cycloaliphatic hydrocarbon resin ("HCR") at 25 wt. % and having a ring and ball softening point of at least 115° C. and 125° C., respectively. Sample 4 included polycylopentadiene ("PCPD") in an amount of 25 wt. %. The polypropylene had a crystallinity of about 99% or more. For preparing the samples, the respective amounts of the components were blended and extruded within a temperature of from 370-500° F. Using this process, pellets were formed to prepare samples for analysis including the determination of mechanical properties and optical properties.

| Sample | 1 | 2 | 3 | 4 |
|---|---|---|---|---|
| Polyolefin Polymer | HDPE | HCPP | HCPP | HCPP |
| Hydrocarbon Resin | — | $C_9$ resin | $C_9$ resin | PCPD |
| Melt Flow 230° C. (g/10 min) | 2.2 | 6.5 | 5.8 | 5.6 |
| Tensile Strength at Yield (MPa) | 39.8 | 43.6 | 42.5 | 43.8 |
| Percent Elongation at Yield (%) | 4.85 | 2.05 | 1.61 | 1.67 |
| Flexural Tangent Modulus (MPa) | 2220 | 3160 | 3160 | 3390 |
| Flexural Secant Modulus (MPa) | 2100 | 3000 | 3050 | 3270 |
| Test Speed (mm/min) | 1.3 | 1.3 | 1.3 | 1.3 |
| Notched Izod at 23° C. (J/m) | 20.6 | 10.4 | 13.1 | 12.7 |
| Gardner Impact at 23° C. (J) | 2.26 | <0.903 | <0.903 | <0.903 |
| DTUL at 0.455 MPa (° C.) | 120 | 70.4 | 75.5 | 82.3 |
| Rockwell Hardness (R) | 109.28 | 109.98 | 113.08 | 114.84 |
| Haze 25 mil (%) | 27.7 | 11.1 | 10.5 | 11.6 |

-continued

| Sample | 1 | 2 | 3 | 4 |
|---|---|---|---|---|
| Haze 50 mil (%) | 48.7 | 31.1 | 27.6 | 51.1 |
| Clarity 25 mils (%) | 97.43 | 99.2 | 99.23 | 99.2 |
| Clarity 50 mils (%) | 92.63 | 98.8 | 99 | 98.6 |

As indicated in the table above, the mechanical properties (e.g., flexural properties and tensile strength at yield) improved with the addition of the hydrocarbon resin. Meanwhile, addition of the hydrocarbon resin resulted in a slight reduction in the percent elongation at yield. In addition, the optical properties also improved with the addition of the hydrocarbon resin.

Example 3

In sample 5, a high crystallinity polypropylene ("HCPP") was modified using polycylopentadiene ("PCPD") at 30 wt. %. In samples 6-7, a polypropylene homopolymer ("PP") was modified using polycylopentadiene ("PCPD") at 30 wt. %. The polypropylene in sample 5 had a melt flow rate of 2.3 g/10 min that of samples 6 and 7 had a melt flow rate of 12 g/10 min. In this regard, the polypropylene of samples 6 and 7 was vis-broken (rheology modified) with peroxide to increase the melt flow rate. The polypropylene in sample 5 also had a DTUL of 133° C. while that of samples 6 and 7 had a DTUL 66° C. at 0.455 MPa. The high crystallinity polypropylene had a crystallinity of about 99% or more. Samples 5-7 also included a phosphorus based nucleating agent. For preparing the samples, the respective amounts of the components were blended and extruded within a temperature of from 370-500° F. Using this process, pellets were formed to prepare samples for analysis including the determination of mechanical properties.

| Sample | 5 | 6 | 7 |
|---|---|---|---|
| Polyolefin Polymer | HCPP | PP | PP |
| Hydrocarbon Resin | PCPD | PCPD | PCPD |
| Nucleating Agent | Yes (1000 ppm) | Yes (1000 ppm) | Yes (5000 ppm) |
| Flexural Tangent Modulus (MPa) | 3520 | 3250 | 3350 |
| Flexural Secant Modulus (MPa) | 3420 | 3140 | 3220 |
| Test Speed (mm/min) | 1.3 | 1.3 | 1.3 |
| Notched Izod at 23° C. (J/m) | 8.72 | 9.85 | 10.4 |
| Gardner Impact at 23° C. (J) | <0.903 | <0.903 | <0.903 |
| DTUL at 0.455 MPa (° C.) | 84.1 | 70.2 | 67 |
| Melt Flow 230° C. (g/10 min) | 6.2 | 43 | 38 |
| Rockwell Hardness (R) | 106.4 | 108.98 | 110.76 |

Example 4

In samples 8-14, a high crystallinity polypropylene ("HCPP") was modified using polycylopentadiene ("PCPD"). In samples 15-18, a polypropylene homopolymer ("PP") was modified using polycylopentadiene ("PCPD"). The HCPP had a crystallinity of about 99% or more. Certain examples below also included a clarifier or nucleating agent. For instance, samples 9 and 16 included a phosphorus based nucleating agent. Meanwhile, samples 10 and 14 included a nonitol based nucleating agent. Also, sample 11 included sodium benzoate. For preparing the samples, the respective amounts of the components were blended and extruded within a temperature of from 370-500° F. Using this process, pellets were formed to prepare samples for analysis including the determination of mechanical properties, optical properties, and mold shrinkage properties.

| Sample | 8 | 9 | 10 | 11 | 12 | 13 |
|---|---|---|---|---|---|---|
| Polyolefin Polymer | HCPP | HCPP | HCPP | HCPP | HCPP | HCPP |
| Hydrocarbon Resin | — | — | — | — | 5 wt. % PCPD | 10 wt. % PCPD |
| Clarifier/Nucleating Agent | — | Yes (800 ppm) | Yes (2100 ppm) | Yes (2000 ppm) | — | — |
| Melt Flow 230° C. (g/10 min) | 3.4 | 3.2 | 3.1 | 2.9 | 3.3 | 2.7 |
| Tensile Stress @ yield (50 mm/min) (MPa) | 37 | 40.7 | 39.8 | 40.2 | 39.6 | 41.8 |
| Tensile Strain @ yield (50 mm/min) (%) | 6.09 | 4.22 | 4.81 | 4.48 | 5.79 | 4.26 |
| Flexural Tangent Modulus (1.3 mm/min) (MPa) | 2010 | 2500 | 2330 | 2410 | 2420 | 2720 |
| Flexural Secant Modulus (1.3 mm/min) (MPa) | 1840 | 2270 | 2090 | 2190 | 2170 | 2530 |
| DTUL at 0.455 MPa (° C.) | 103 | 130 | 119 | 127 | 99 | 85 |
| Yellowness Index | −0.76 | −2.13 | −3.53 | −3.1 | −1.29 | −1.24 |
| % Haze (25 mil) (%) | 45.2 | 15.4 | 29.2 | 26.8 | 42.2 | 38.8 |

-continued

| | | | | | | |
|---|---|---|---|---|---|---|
| Mold Shrinkage after 48 h at 23° C. (Flow direction) (%) | 1.5299 | 1.6278 | 1.7661 | 1.7052 | 1.5219 | 1.3691 |
| Mold Shrinkage after 48 h at 23° C. (Cross-flow direction) (%) | 1.5696 | 1.9893 | 1.76 | 2.0487 | 1.6396 | 1.5307 |

| Sample | 14 | 15 | 16 | 17 | 18 |
|---|---|---|---|---|---|
| Polyolefin Polymer | HCPP | PP | PP | PP | PP |
| Hydrocarbon Resin | 5 wt. % PCPD | — | — | 5 wt. % PCPD | 10 wt. % PCPD |
| Clarifier/Nucleating Agent | Yes (2100 ppm) | — | Yes (800 ppm) | — | — |
| Melt Flow 230° C. (g/10 min) | 3 | 4.1 | 4.7 | 5 | 6.8 |
| Tensile Stress @ yield (50 mm/min) (MPa) | 42.2 | 36.4 | 38.1 | 36.2 | 37 |
| Tensile Strain @ yield (50 mm/min) (%) | 4.98 | 8.18 | 6.21 | 7.61 | 6.85 |
| Flexural Tangent Modulus (1.3 mm/min) (MPa) | 2630 | 1810 | 2020 | 1960 | 2190 |
| Flexural Secant Modulus (1.3 mm/min) (MPa) | 2380 | 1620 | 1830 | 1750 | 1950 |
| DTUL at 0.455 MPa (° C.) | 107 | 102 | 120 | 97 | 85 |
| Yellowness Index | −5.89 | 1.88 | −1.86 | 1.17 | 1.85 |
| % Haze (25 mils) (%) | 27.4 | 49.2 | 20.3 | 28.6 | 29.6 |
| Mold Shrinkage after 48 h at 23° C. (Flow direction) (%) | 1.7296 | 1.4865 | 1.5209 | 1.3621 | 1.2732 |
| Mold Shrinkage after 48 h at 23° C. (Cross-flow direction) (%) | 1.8134 | 1.5666 | 1.8194 | 1.4967 | 1.4233 |

Example 5

In samples 19-23, a random copolymer ("RCP") was modified using 20 wt. % of the respective hydrocarbon resin. The random copolymer included about 2.3 wt. % ethylene and the polymer had a melt flow rate of about 2 g/10 min. The examples also included a nonitol based nucleating agent. For preparing the samples, the respective amounts of the components were blended and extruded within a temperature of from 370-500° F. Using this process, pellets were formed to prepare samples for analysis including the determination of mechanical properties, optical properties, mold shrinkage properties, and oxygen transmission properties. The oxygen transmission rate was determined with the following conditions: 100% O2, 50% relative humidity, 760 mmHg gas pressure, and test temperature 23° C.

| Sample | 19 | 20 | 21 | 22 | 23 |
|---|---|---|---|---|---|
| Polyolefin Polymer | RCP | RCP | RCP | RCP | RCP |
| Hydrocarbon Resin | — | PCPD (low molecular weight; hydrogenated) | $C_5$ fully hydrogenated aliphatic resin | $C_9$ fully hydrogenated cycloaliphatic resin | High MW PCPD |
| Clarifier/Nucleating Agent | Yes (2100 ppm) | Yes (2100 ppm) | Yes (2100 ppm) | Yes (2100 ppm) | Yes (2100 ppm) |
| Flexural Tangent Modulus (1.3 mm/min) (MPa) | 1230 | 1010 | 1050 | 916 | 1540 |
| Flexural Secant Modulus (1.3 mm/min) (MPa) | 1160 | 885 | 905 | 790 | 1410 |
| Tensile Stress @ yield (50 mm/min) (MPa) | 30.8 | 24.6 | 24.1 | 24 | 29.9 |
| Percent Elongation at Yield (%) | 10.2 | 11.9 | 10.4 | 12.7 | 5.45 |
| DTUL at 0.455 MPa (° C.) | 88.7 | 59.4 | 50.1 | 56 | 56.1 |
| Melt Flow 230° C. (g/10 min) | 2 | 4.3 | 4.1 | 3.8 | 3.7 |

-continued

| Sample | 19 | 20 | 21 | 22 | 23 |
|---|---|---|---|---|---|
| Mold Shrinkage after 48 h at 23° C. (Flow direction) (%) | 1.3895 | 1.051 | 0.992 | 1.0315 | 0.9795 |
| Mold Shrinkage after 48 h at 23° C. (Cross-flow direction) (%) | 1.4575 | 1.135 | 1.1145 | 1.1255 | 1.137 |
| Notched Izod at 23° C. (J/m) | 44.3 | 20.7 | 20.9 | 20.4 | 21.2 |
| Gardner Impact at 23° C. (J) | >36.1 | 1.63 | <0.903 | 2.35 | <0.903 |
| Rockwell Hardness (R) | 82.84 | 65.18 | 66.44 | 59.3 | 86.72 |
| Clarity (25 mils) (%) | 98.4 | 99.13 | 99.13 | 99.16 | 99.2 |
| Haze (25 mils) (%) | 10.13 | 11.9 | 8.77 | 9.63 | 10.04 |
| Yellowness Index | −10 | −8.4 | −15.1 | −7.5 | −8.3 |
| Oxygen Transmission Rate (10 mils) ($cm^3/m^2$ day) | 252 / 250 | 111 / 110 | 144 / 143 | 111 / 113 | 115 / 116 |

Example 6

In samples 25 and 27-29, the polyolefin polymer was modified using a respective hydrocarbon resin in an amount of 25 wt. %. In samples 27 and 28, the $C_9$ aliphatic hydrocarbon resin had a ring and ball softening point of at least 115° C. and 125° C., respectively. The polypropylene had a crystallinity of about 99% or more. For preparing the samples, the respective amounts of the components were blended and extruded within a temperature of from 370-500° F. Using this process, pellets were formed to prepare samples for analysis including the determination of the oxygen transmission rate and water vapor transmission rate. The oxygen transmission rate was determined with the following conditions: 100% O2, 50% relative humidity, 760 mmHg gas pressure, and test temperature 23° C. The water vapor transmission rate was determined with the following conditions: 50% relative humidity and test temperature 23° C.

| Sample | 24 | 25 | 26 | 27 | 28 | 29 |
|---|---|---|---|---|---|---|
| Polyolefin Polymer | HDPE | HDPE | HCPP | HCPP | HCPP | HCPP |
| Hydrocarbon Resin | — | PCPD | — | $C_9$ resin | $C_9$ resin | PCPD |
| Oxygen Transmission Rate (8 mils) ($cm^3/m^2$ day) | 199 / 201 | — | — | — | — | — |
| Oxygen Transmission Rate (18 mils) ($cm^3/m^2$ day) | — | 396 / 397 | 133 / 111 | 80.0 / 86.4 | 102 / 125 | 69.4 / 74.3 |
| Water Vapor Transmission Rate ($g/m^2$ day) | — | — | 0.077 / 0.075 | 0.034 / 0.035 | 0.270 / 0.111 | 0.034 / 0.045 |

Example 7

In samples 30-34, an impact copolymer ("ICP") (heterophasic copolymer) was modified using hydrogenated polycylopentadiene ("PCPD"). The impact copolymer included about 7 wt. % ethylene. Examples 33 and 34 includes bicyclo[2.2.1]heptane-2,3-dicarboxylic acid disodium salt as the nucleating agent. For preparing the samples, the respective amounts of the components were blended and extruded within a temperature of from 370-500° F. Using this process, pellets were formed to prepare samples for analysis including the determination of mechanical properties.

| Sample | 30 | 31 | 32 | 33 | 34 |
|---|---|---|---|---|---|
| Polyolefin Polymer | ICP | ICP | ICP | ICP | ICP |
| Hydrocarbon Resin | — | 12.5 wt. % | 25 wt. % | 12.5 wt. % | 25 wt. % |
| Clarifier/Nucleating Agent | — | — | — | Yes (750 ppm) | Yes (750 ppm) |

-continued

| Sample | 30 | 31 | 32 | 33 | 34 |
|---|---|---|---|---|---|
| Flexural Tangent Modulus (1.3 mm/min) (MPa) | 1200 | 1330 | 1610 | 1410 | 1580 |
| Flexural Secant Modulus (1.3 mm/min) (MPa) | 1130 | 1220 | 1510 | 1280 | 1480 |
| Tensile Stress @ yield (50 mm/min) (MPa) | 26.1 | 25.2 | 28.6 | 26 | 27.7 |
| Percent Elongation at Yield (%) | 7.64 | 7.24 | 3.34 | 7.13 | 3.49 |
| DTUL at 0.455 MPa (° C.) | 90.7 | 61.1 | 48.1 | 63.9 | 51.6 |
| Melt Flow 230° C. (g/10 min) | 2.6 | 3.3 | 4.8 | 3.3 | 5.4 |

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

The invention claimed is:

1. A polymeric substrate comprising:
a barrier layer including a polymeric material comprising about 50 wt. % or more of at least one polyolefin polymer and 50 wt. % or less of a hydrocarbon resin, wherein the polymeric material exhibits a DTUL of 30° C. or more and a flexural secant modulus of 500 MPa or more, and
further wherein the barrier layer has a thickness of greater than 200 μm to 6,500 μm.

2. The polymeric substrate of claim 1, wherein the at least one polyolefin polymer comprises an ethylene polymer.

3. The polymeric substrate of claim 1, wherein the at least one polyolefin polymer comprises a propylene polymer.

4. The polymeric substrate of claim 3, wherein the propylene polymer comprises a propylene homopolymer.

5. The polymeric substrate of claim 3, wherein the propylene polymer comprises a propylene copolymer including at least one comonomer comprising ethylene, a $C_4$-$C_{20}$ α-olefin, or a mixture thereof.

6. The polymeric substrate of claim 1, wherein the hydrocarbon resin comprises an aliphatic hydrocarbon resin, an aliphatic/aromatic hydrocarbon resin, an aromatic hydrocarbon resin, a polyterpene resin, a terpene-phenol resin, a rosin ester, a rosin acid, or a mixture thereof.

7. The polymeric substrate of claim 1, wherein the hydrocarbon resin is partially hydrogenated.

8. The polymeric substrate of claim 1, wherein the hydrocarbon resin is fully hydrogenated.

9. The polymeric substrate of claim 1, wherein the hydrocarbon resin is an aliphatic hydrocarbon resin.

10. The polymeric substrate of claim 9, wherein the aliphatic hydrocarbon resin is a $C_9$ aliphatic hydrocarbon resin.

11. The polymeric substrate of claim 1, wherein the hydrocarbon resin comprises a polycyclopentadiene.

12. The polymeric substrate of claim 1, wherein the hydrocarbon resin has a weight average molecular weight of from about 400 g/mol to about 5,000 g/mol.

13. The polymeric substrate of claim 1, wherein the hydrocarbon resin has a ring and ball softening point of about 110° C. or more.

14. The polymeric substrate of claim 1, wherein the hydrocarbon resin comprises an aromatic $C_9$ hydrogenated resin having a ring and ball softening point of about 110° C. or more.

15. The polymeric substrate of claim 1, wherein the barrier layer has a water vapor transmission rate of 3.0 $cm^3/m^2$/day or less and/or an oxygen transmission rate of 60 $cm^3$/100 $in^2$/day or less.

16. The polymeric substrate of claim 1, wherein the barrier layer has a thickness of from 250 μm to 2,000 μm.

17. The polymeric substrate of claim 1, wherein the polymeric substrate is a monolayer polymeric substrate.

18. The polymeric substrate of claim 1, wherein the polymeric substrate is a multilayer polymeric substrate including at least one additional layer.

19. A shaped polymeric article comprising the polymeric substrate of claim 1.

20. The shaped polymeric article of claim 19, wherein the shaped polymeric article is a thermoformed shaped polymeric article, a blow molded shaped polymeric article, or an injection molded shaped polymeric article.

* * * * *